(12) United States Patent
Riemer et al.

(10) Patent No.: US 11,791,521 B2
(45) Date of Patent: Oct. 17, 2023

(54) ELECTRODE TABS AND METHODS OF FORMING

(71) Applicant: Hutchinson Technology Incorporated, Hutchinson, MN (US)

(72) Inventors: Douglas P. Riemer, Waconia, MN (US); Peter F. Ladwig, Hutchinson, MN (US); Joseph D. Starkey, Cologne, MN (US); Michael W. Davis, Rockford, MN (US); Duane M. Jelkin, Hutchinson, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 290 days.

(21) Appl. No.: 17/017,471

(22) Filed: Sep. 10, 2020

(65) Prior Publication Data
US 2021/0083257 A1 Mar. 18, 2021

Related U.S. Application Data

(60) Provisional application No. 62/900,419, filed on Sep. 13, 2019.

(51) Int. Cl.
*H01M 50/534* (2021.01)
*C25D 3/12* (2006.01)
*C25D 7/06* (2006.01)
*H01M 10/0525* (2010.01)

(52) U.S. Cl.
CPC ............ *H01M 50/534* (2021.01); *C25D 3/12* (2013.01); *C25D 7/0614* (2013.01); *H01M 10/0525* (2013.01)

(58) Field of Classification Search
CPC ............ H01M 50/531; H01M 50/534; H01M 10/0525; H01M 50/564; H01M 50/571; C25D 3/12; C25D 7/0614
See application file for complete search history.

(56) References Cited

U.S. PATENT DOCUMENTS

| 6,267,790 B1 * | 7/2001 | Daroux | ............... H01M 50/133 29/623.2 |
| 8,133,604 B1 | 3/2012 | Nakahara et al. | |

(Continued)

FOREIGN PATENT DOCUMENTS

| CN | 102439430 B | 8/2013 |
| CN | 104900932 A | 9/2015 |

(Continued)

OTHER PUBLICATIONS

Corrected International Search Report in International Application No. PCT/US2020/050558, dated Jun. 17, 2021.

(Continued)

*Primary Examiner* — Brian R Ohara
*Assistant Examiner* — Emily Elizabeth Freeman
(74) *Attorney, Agent, or Firm* — DLA Piper LLP (US)

(57) ABSTRACT

Electric tabs and methods for manufacturing are described. A method includes disposing a dielectric layer on a second side of a base material, the base material having a first side and the second side. The method including developing the dielectric layer on the second side of the base material. And, the method including etching the first side of the base material to form an electrode tab.

23 Claims, 16 Drawing Sheets

(56) References Cited

U.S. PATENT DOCUMENTS

| | | | |
|---|---|---|---|
| 2001/0052510 A1* | 12/2001 | Schemenaur | H05K 3/383 |
| | | | 216/13 |
| 2003/0211425 A1 | 11/2003 | Mao et al. | |
| 2008/0102362 A1* | 5/2008 | Nii | H01M 50/557 |
| | | | 429/161 |
| 2009/0239130 A1 | 9/2009 | Culver et al. | |
| 2009/0325073 A1* | 12/2009 | Okano | C23C 18/42 |
| | | | 427/125 |
| 2013/0004811 A1 | 1/2013 | Banerjee et al. | |
| 2013/0143084 A1 | 6/2013 | Kim et al. | |
| 2013/0323542 A1 | 12/2013 | Wijayawardhana et al. | |
| 2013/0323554 A1 | 12/2013 | Heubner et al. | |
| 2014/0092375 A1 | 4/2014 | Raghavan et al. | |
| 2014/0199581 A1 | 7/2014 | Ryu et al. | |
| 2014/0312911 A1 | 10/2014 | Ding | |
| 2014/0370338 A1 | 12/2014 | Lim | |
| 2015/0111077 A1 | 4/2015 | Paik et al. | |
| 2015/0155571 A1* | 6/2015 | Higashi | H01M 8/2428 |
| | | | 429/468 |
| 2015/0171489 A1 | 6/2015 | Inaba et al. | |
| 2015/0318542 A1* | 11/2015 | Morozumi | H01M 4/364 |
| | | | 427/122 |
| 2016/0050750 A1 | 2/2016 | Rogers et al. | |
| 2016/0248074 A1* | 8/2016 | Suguro | H01M 50/553 |
| 2017/0077487 A1 | 3/2017 | Coakley et al. | |
| 2017/0208686 A1 | 7/2017 | Fukuchi | |
| 2017/0219443 A1 | 8/2017 | Davis et al. | |
| 2017/0250392 A1* | 8/2017 | Guo | H01M 50/40 |
| 2017/0330695 A1* | 11/2017 | Frank | H01M 50/116 |
| 2018/0316067 A1 | 11/2018 | Schwarzberger et al. | |
| 2020/0076016 A1 | 3/2020 | Riemer et al. | |
| 2020/0313152 A1 | 10/2020 | Stefanopoulou et al. | |
| 2021/0083258 A1 | 3/2021 | Riemer et al. | |

FOREIGN PATENT DOCUMENTS

| | | |
|---|---|---|
| CN | 106159364 A | 11/2016 |
| CN | 107026282 A | 8/2017 |
| CN | 108987659 A | 12/2018 |
| CN | 109065961 A | 12/2018 |
| IN | 201741021696 A | 12/2018 |
| JP | 2014-225406 A | 12/2014 |
| JP | 2017162546 A * | 9/2017 |
| KR | 1976084 B1 * | 5/2019 |
| WO | WO-0177753 A1 * | 10/2001 |
| WO | WO 2016/108888 A1 | 7/2016 |
| WO | WO 2017/087807 A1 | 5/2017 |
| WO | WO-2019066460 A1 * | 4/2019 |
| WO | WO 2019/146960 A1 | 8/2019 |

OTHER PUBLICATIONS

International Search Report and Written Opinion in International Application No. PCT/US2020/050561, dated Feb. 4, 2021.
Office Action in U.S. Appl. No. 17/017,523 dated Nov. 27, 2020.
International Preliminary Report on Patentability in International Application No. PCT/US2020/050561, dated Mar. 24, 2022.
International Preliminary Report on Patentability in International Application No. PCT/US2020/050558, dated Mar. 24, 2022.
Notice of Allowance in U.S. Appl. No. 17/017,523 dated Jan. 5, 2022.
International Search Report and Written Opinion in International Application No. PCT/US2020/050558, dated Mar. 11, 2021.
Office Action in U.S. Appl. No. 17/017,523 dated Apr. 16, 2021.

* cited by examiner

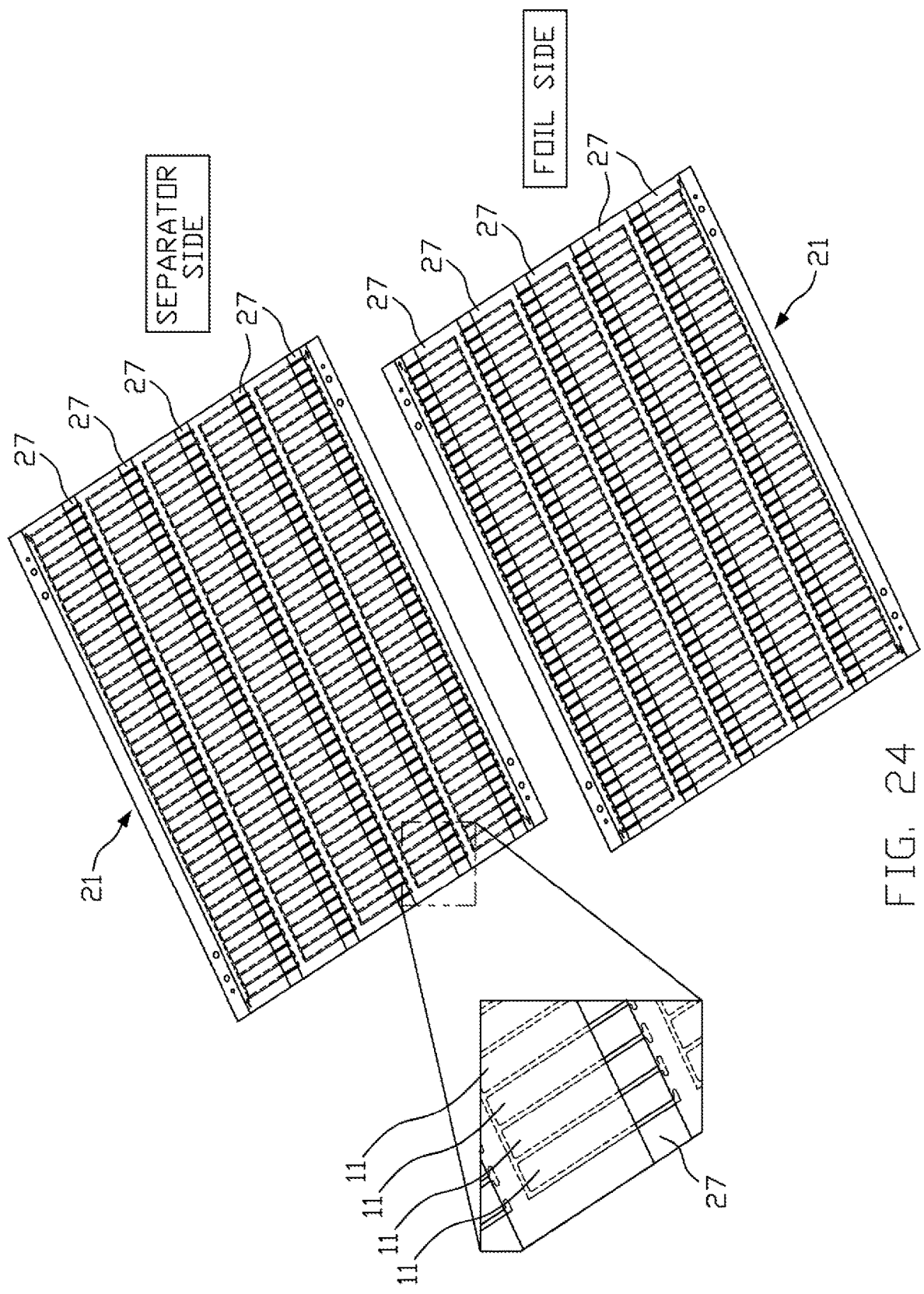

ELECTRODE TABS AND METHODS OF FORMING

CROSS-REFERENCE TO RELATED APPLICATIONS

This application claims priority from U.S. Provisional Patent Application No. 62/900,419, filed on Sep. 13, 2019, which is hereby incorporated by reference in its entirety.

FIELD

Embodiments of the present disclosure generally relate to batteries, such as lithium ion pouch batteries. In particular, embodiments of the present disclosure relate to a process for forming electrode tabs.

BACKGROUND

Lithium ion pouch batteries have two electrical terminals, i.e., an anode tab and a cathode tab, extending out of the pouch. The anode tab is attached to the anode foil of the battery and the cathode tab is attached to the cathode foil of the battery. Both terminals are sensitive to burrs during the manufacturing of the tabs and attaching of tabs to the anode and cathode.

Ultrasonic welding is commonly used for bonding, e.g., the anode tab to the anode foil and the cathode tab to the cathode foil, which can result in indentations and protrusions, i.e., burrs. Such burrs can lead to battery shorting by piercing through the separator membrane and shorting to the other side of the battery. Therefore, there is a need for an electrode tab that eliminates burr formation or protects against burr formation during ultrasonic welding.

SUMMARY

Electric tabs and methods for manufacturing are described. The method includes disposing a dielectric layer on a second side of a base material, the base material having a first side and the second side. The method including developing the dielectric layer on the second side of the base material. And, the method including etching the first side of the base material to form an electrode tab.

Other features and advantages of embodiments of the present disclosure will be apparent from the accompanying drawings and from the detailed description that follows.

BRIEF DESCRIPTION OF THE DRAWINGS

Embodiments of the present disclosure are illustrated by way of example and not limitation in the figures of the accompanying drawings, in which like references indicate similar elements.

FIG. 24 illustrates a nickel layer electroplated on the array of anode tabs according to some embodiments of the present disclosure.

DETAILED DESCRIPTION

Figure 1:
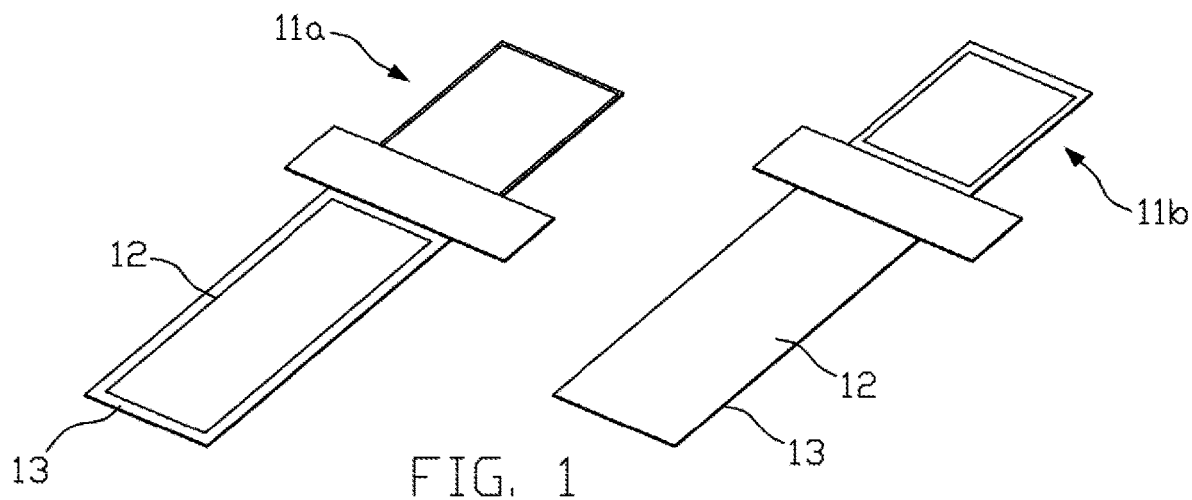
FIG. 1 illustrates an anode tab formed according to some embodiments of the present disclosure.

Embodiments of an electrode tab and methods of forming an electrode tab are described. FIG. 1 illustrates a first surface of an anode tab 11a and a second surface of an anode tab 11b. Referring to FIG. 1, an anode tab 11 formed by a method described in the present disclosure is provided. The anode tab 11 includes a base material 12, a polyimide coating 13, and a sealant 14 disposed along a short axis of the anode tab 11.

Figure 2:
FIG. 2 illustrates a roll of base material according to some embodiments of the present disclosure.

FIGS. 2-11 describe a method for forming the anode tab 11. Referring to FIG. 2, a roll of base material 12 is provided. For some embodiments, the base material 12 is a material having higher conductivity than nickel. For some embodiments, the base material 12 is copper foil. The copper foil can have a thickness from 20-50 microns ("μm"). For some embodiments, the copper foil can have a thickness of 30 μm.

Figure 3:
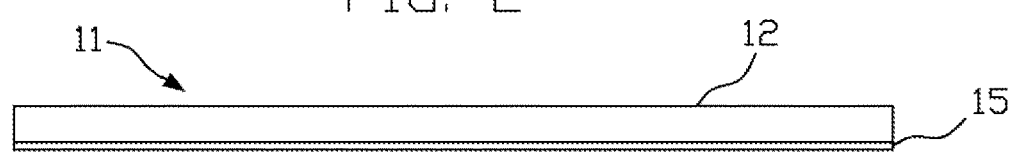
FIG. 3 illustrates a tie layer disposed on one side of the base material according to some embodiments of the present disclosure.

FIG. 3 illustrates a tie layer 15 disposed on one side of the base material 12. For some embodiments, tie layer 15 can range from about 2 nm to about 500 nm thick and are formed by methods such as vacuum sputtering, vacuum evaporation, chemical vapor deposition, chemical plating, a conversion coating (e.g., a chromate conversion coating), and other techniques known in the art. The tie layer 15 can be made of chromium (Cr), nickel (Ni), cobalt (Co), molybdenum (Mo) or their related alloys. The tie layer can also be made of other material known in the art. For some embodiments, the tie layer 15 is a sputtered chrome seed layer.

Figure 4:
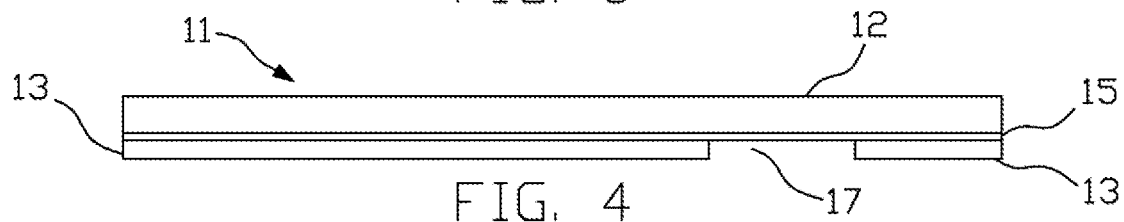
FIG. 4 illustrates a dielectric layer disposed on the tie layer according to some embodiments of the present disclosure.

FIG. 4 illustrates a dielectric layer, for example a polyimide coating 13, disposed on the tie layer 15. Without being bound to a theory, a thin tie layer 15 is employed to promote adhesion between the base material 12 and the polyimide coating 13, to prevent or minimize corrosion at the interface between the base material 12 and the polyimide coating 13, and to provide a diffusion barrier between the base material 12 and the polyimide coating 13. For some embodiments, the polyimide coating 13 can be applied in a thickness of 5 to 10 μm to minimize thickness of the anode tab 11. The polyimide coating 13 is applied using techniques including, but not limited to, liquid slot die, roller coat, spray, curtain coat, dry film lamination, and screen-printing techniques. For some embodiments, the polyimide coating 13 is applied by liquid slot die and then developed. The polyimide coating 13 is developed with an appropriate solvent known in the art.

Figure 5:
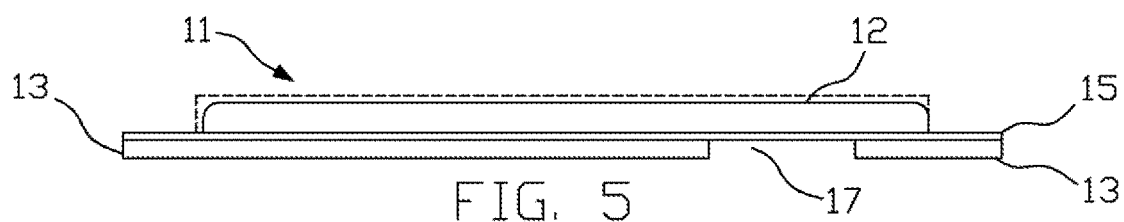
FIG. 5 illustrates an anode tab having an etched pattern according to some embodiments of the present disclosure.

FIG. 5 illustrates the anode tab 11 having an etched pattern 17. A resist coating is applied on the base material 12 using techniques including, but not limited to, liquid slot die, roller coat, spray, curtain coat, dry film lamination, and screen-printing techniques. The resist coating is then exposed to UV light, developed, etched (that is, the base material 12 is etched in regions not protected by the resist pattern), and stripped using photolithography and etching techniques including those known in the art. For some embodiments, the resist coating is applied on a single side, i.e., on the base material 12, and the tie layer 15 serves as an etching barrier for the second side of the anode tab 11.

Figure 6:
FIG. 6 illustrates a base material having rounded edges according to some embodiments of the present disclosure.

FIG. 6 illustrates the base material 12 having optional rounded edges 18. For some embodiments, the method for forming anode tabs includes rounding the edges 18 of the remaining base material 12 after etching. Rounding the edges 18 of the base material 12 can be performed using well-known techniques in the art. For some embodiments, rounding the edges 18 of the remaining base material 12 after etching is an optional step in the method for producing anode tabs.

Figure 7:
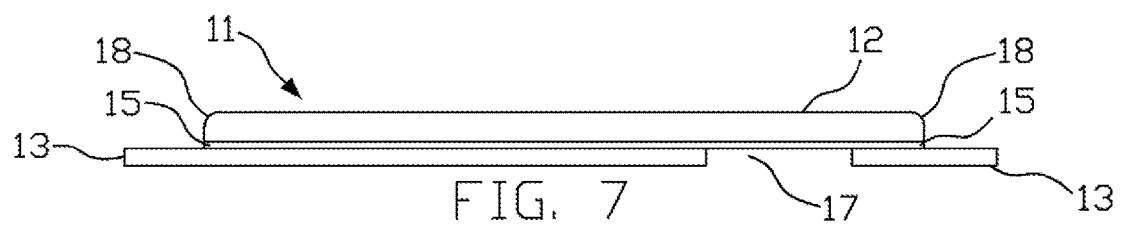
FIG. 7 illustrates a micro-etched tie layer according to some embodiments of the present disclosure.

FIG. 7 illustrates a micro-etched tie layer 15. For some embodiments, the method includes micro-etching the tie layer 15. Micro-etching the tie layer 15 can occur in regions that the base material 12 has been etched and in between lanes of the polyimide coating 13 on the second side of the anode tab 11. Micro-etching the tie layer 15 can be performed using an oxidative process or by other techniques known in the art.

Figure 8:
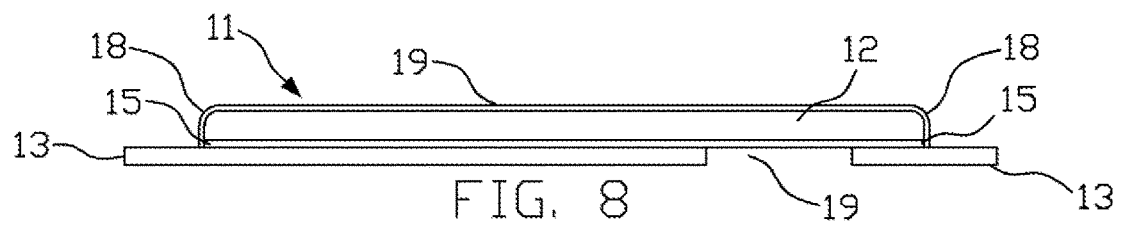
FIG. 8 illustrates a nickel layer electroplated on the anode tab according to some embodiments of the present disclosure.

FIG. 8 illustrates a nickel layer 19 electroplated on the anode tab 11. In some embodiments, the method includes electroplating nickel on the anode tab 11. For some embodiments, the nickel layer 19 is about 1-5 μm in thickness. Preferably, the nickel layer 19 is about 2 μm in thickness. Electroplating nickel on the anode tab 11 can be performed using techniques including, but not limited to, electrolytic, electroless, and techniques including those well-known in the art.

Figure 9:
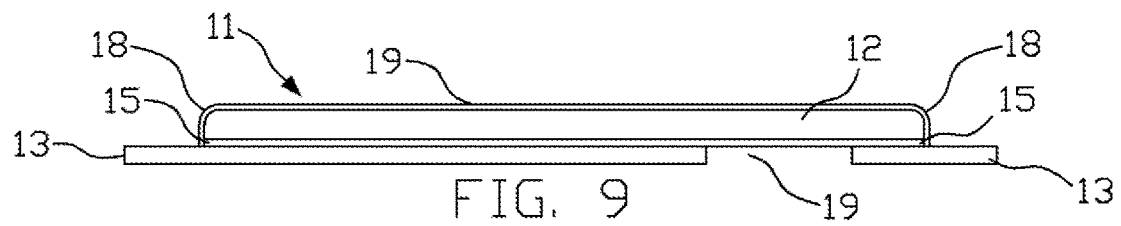
FIG. 9 illustrates an anode tab that is panelized, AOI inspected, and defect-marked according to some embodiments of the present disclosure.

FIG. 9 illustrates an anode tab 11 that is panelized, automated optical inspection ("AOI") inspected, and defect-marked. Such steps can be performed using techniques well-known in the art.

Figure 10:
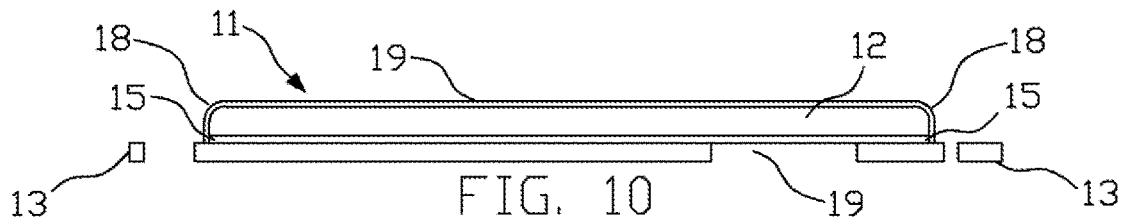
FIG. 10 illustrates an anode tab in which the polyimide coating is cut through to form the shape of the anode tab according to some embodiments of the present disclosure.

FIG. 10 illustrates the anode tab 11 in which the polyimide coating 13 is cut through to form the shape of the anode tab 11. For some embodiments, the method includes cutting through the polyimide coating 13 on a perimeter of the anode tab 11. Cutting through the polyimide coating 13 can be performed using a metal stamping process or a laser cutting process. Other techniques known in the art can also be used to cut through the polyimide coating on a perimeter of the anode tab 11.

Figure 11:
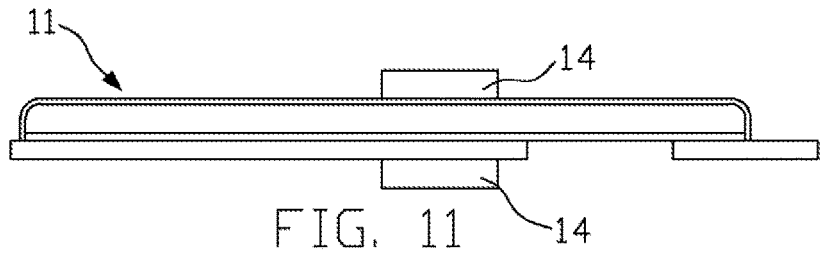
FIG. 11 illustrates the anode tab having a sealant applied thereon according to some embodiments of the present disclosure.

FIG. 11 illustrates the anode tab 11 having a sealant 14 applied thereon. For some embodiments, the method includes applying a sealant 14 thereon. The sealant 14 can applied along a short axis of the anode tab 11 on a first side and an second side of the anode tab 11. For some embodiments, the sealant 14 is a heat seal tape such as but limited EVA, Polypropylene, and PET. Other sealants known in the art can also be used.

According to some embodiments, the anode tab 11 includes a dielectric layer, such as a polyimide layer, disposed on a single side of the anode tab constructed of nickel-plated copper. The anode tab 11 reduces the total thickness relative to the conventional anode tabs, while still maintaining the burr protection. For example, a conventional nickel/chrome tab has a thickness of about 80 μm. The conventional tab requires an additional tape having a thickness of about 10 μm for burr protection, such as one made of PET film with acrylic adhesive. Thus, the conventional anode tab has a thickness of about 90 μm. According to some embodiments of the present disclosure, the anode tab 11 can have a base material of about 30 μm and a polyimide coating of about 5-10 μm. Thus, according to some embodiments of the present disclosure, the anode tab 11 can have a thickness of about 35-40 μm, whereas a conventional anode tabs have a thickness of about 90 μm.

Figure 12:
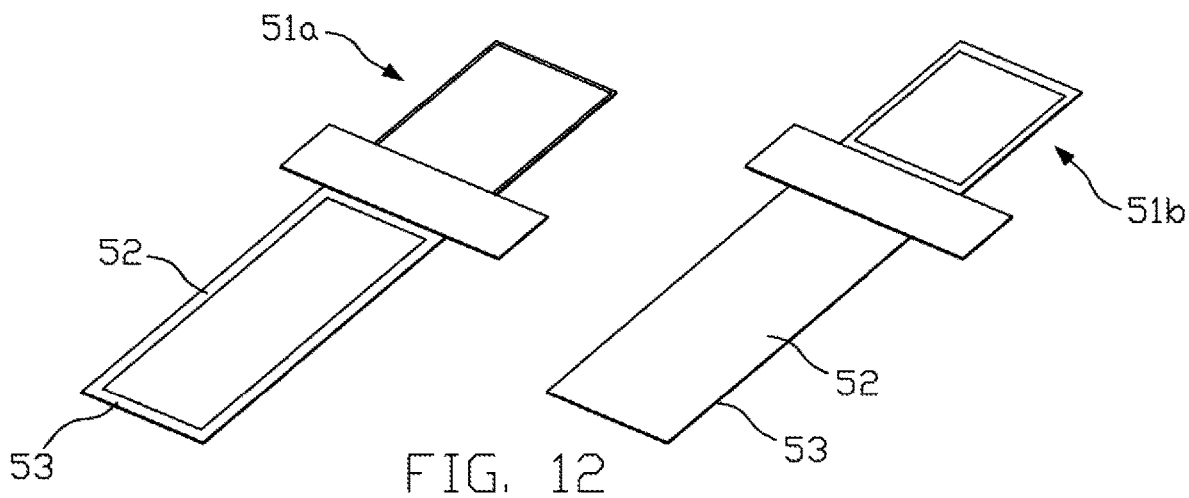
FIG. 12 illustrates a cathode tab according to some embodiments of the present disclosure.

FIG. 12 illustrates a first surface of a cathode tab 51a and a second surface of an cathode tab 51b. Referring to FIG. 12, a cathode tab 51 formed by a method described in the present disclosure is provided. The cathode tab 51 includes a base material 52, a polyimide coating 53, and a sealant 54 disposed along a short axis of the cathode tab 51.

Figure 13:
FIG. 13 illustrates a roll of base material according to some embodiments of the present disclosure.

FIGS. 13-20 refer to a method for making cathode tabs. Referring to FIG. 13, a roll of base material 52 is provided. For some embodiments, the base material 52 is aluminum foil. The aluminum foil can have a thickness from 20-50 μm. For some embodiments, the aluminum foil can have a thickness of 30 m.

Figure 14:
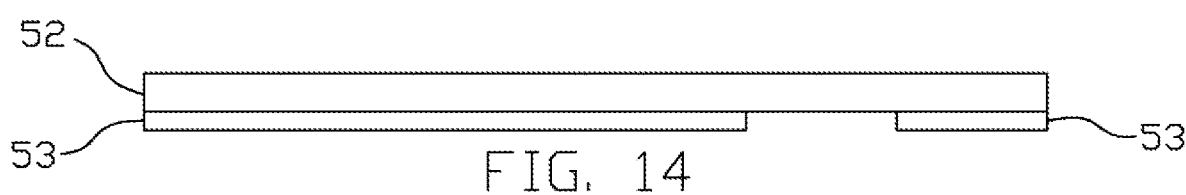
FIG. 14 illustrates a dielectric layer disposed on the second side of the base material according to some embodiments of the present disclosure.

FIG. 14 illustrates a dielectric layer, for example a polyimide coating 53, disposed on the second side of the base material 52. For some embodiments, the polyimide coating 53 can be applied in a thickness of 5 to 10 μm to minimize thickness of the cathode tab 51. The polyimide coating 53 is applied using techniques including, but not limited to, liquid slot die, roller coat, spray, curtain coat, dry film lamination, and screen-printing techniques. For some embodiments, the polyimide coating 53 is applied by liquid slot die and then developed. The polyimide coating 53 is developed with an appropriate solvent known in the art.

Figure 15:
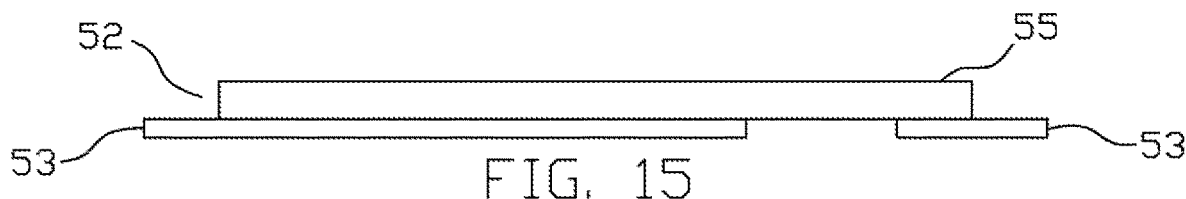
FIG. 15 illustrates a cathode tab having an etched pattern according to some embodiments of the present disclosure.

FIG. 15 illustrates the cathode tab 51 having an etched pattern 55. A resist coating is applied on the base material 52 using techniques including, but not limited to, liquid slot die, roller coat, spray, curtain coat, dry film lamination, and screen-printing techniques. The resist coating is then exposed to UV light, developed, etched (that is, the base material 52 is etched in regions not protected by the resist pattern), and stripped using photolithography and etching techniques including those known in the art. For some embodiments, the resist coating is applied on a single side, i.e., on the base material 52.

Figure 16:
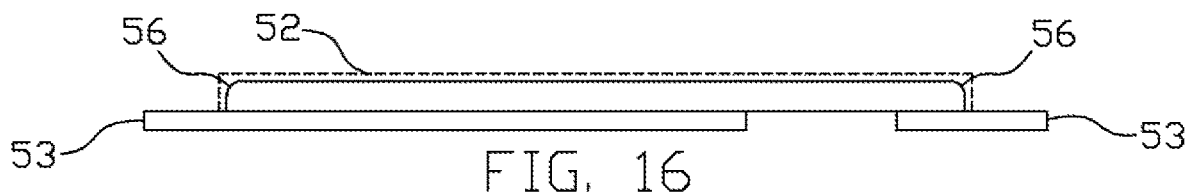
FIG. 16 illustrates the base material having rounded edges according to some embodiments of the present disclosure.

FIG. 16 illustrates the base material 52 having rounded edges 56. For some embodiments, the method for forming cathode tabs includes rounding the edges 56 of the remaining base material 52 after etching. Rounding the edges 56 of the base material 52 can be performed using well-known techniques in the art. For some embodiments, rounding the edges 56 of the remaining base material 52 after etching is an optional step in the method for producing cathode tabs.

Figure 17:
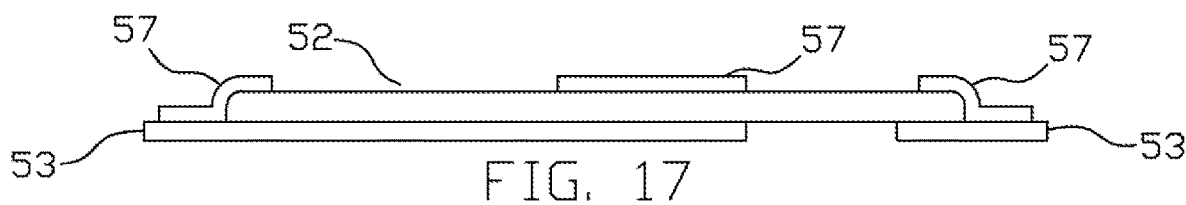
FIG. 17 illustrates a dielectric layer applied on a first side of the cathode tab according to some embodiments of the present disclosure.

FIG. 17 illustrates a dielectric layer 57 applied on a first side of the cathode tab 51. For some embodiments, the method includes applying a dielectric layer 57 to a first side of the cathode tab 51. For some embodiments, the dielectric layer 57 can be selectively applied, e.g., along the rounded edges 56 of the base material 52 by means of stencil, inkjet, or other similar techniques known in the art. The dielectric layer 57, according to some embodiments, is an insulator/insulating layer that cannot be photoimageable, such as, but not limited to, polypropolyne, PET, acrylics, polyamides, non photoimageable polyimides, silicones, or combinations of. Other insulating material known in the art can also be used.

Figure 18:
FIG. 18 illustrates a cathode tab that is panelized, AOI inspected, and defect-marked according to some embodiments of the present disclosure.

FIG. 18 illustrates a cathode tab 51 that is panelized, automated optical inspection (AOI) inspected, and defect-marked. Such steps can be performed using techniques well-known in the art.

Figure 19:
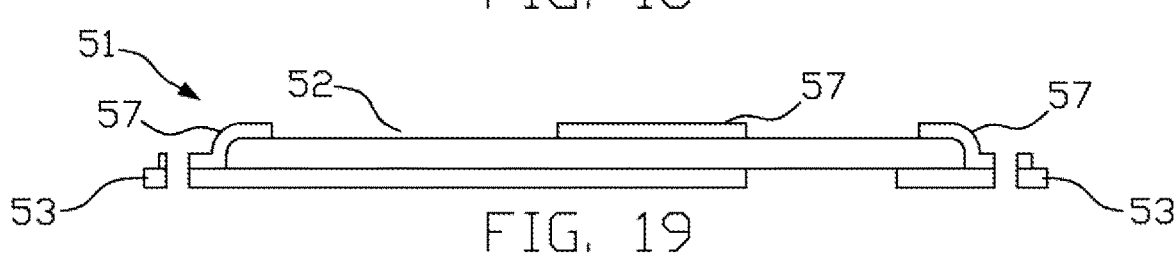
FIG. 19 illustrates a cathode tab in which the polyimide coating is cut through to form the shape of the cathode tab according to some embodiments of the present disclosure.

FIG. 19 illustrates the cathode tab 51 in which the polyimide coating 53 is cut through to form the shape of the cathode tab 51. For some embodiments, the method includes cutting through the polyimide coating 53 on a perimeter of the cathode tab 51. Cutting through the polyimide coating 53 can be performed using a metal stamping process or a laser cutting process. Other techniques known in the art can also be used to cut through the polyimide coating 53 on a perimeter of the cathode tab 51.

Figure 20:
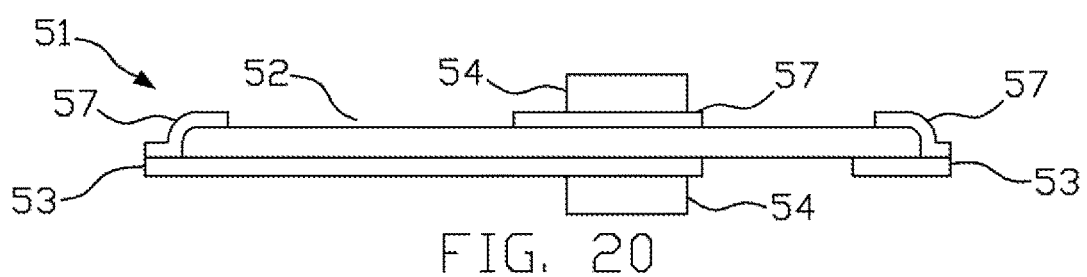
FIG. 20 illustrates a cathode tab having a sealant applied thereon according to some embodiments of the present disclosure.

FIG. 20 illustrates the cathode tab 51 having a sealant 54 applied thereon. For some embodiments, the method includes applying a sealant 54 thereon. The sealant 54 is applied along a short axis of the cathode tab 51 on both the first side and second side of the tab, according to some embodiments. For some embodiments, the sealant 54 is a heat seal tape such, as but limited to, ethylene-vinyl acetate ("EVA"), Polypropylene, and polyethylene terephthalate ("PET"). Other sealants known in the art can also be used.

According to some embodiments, the cathode tab 51 includes a dielectric layer 53, such as a polyimide layer, disposed on a single side of cathode tab constructed of aluminum. The cathode tab 51, according to embodiments described herein, reduces the total thickness relative to the conventional anode tabs, while still maintaining the burr protection. For example, a conventional cathode tab has a thickness of about 80 μm. The conventional tab requires an additional tape having a thickness of about 10 μm on each side of the conventional tab for burr protection, such as one made of PET film with acrylic adhesive. Thus, the conventional cathode tab has a thickness of about 100 μm. According to some embodiments of the present disclosure, the cathode tab 51 can have a base material of about 30 μm and a polyimide coating of about 5-10 μm. Thus, according to some embodiments of the present disclosure, the cathode tab 51 can have a thickness of about 35-40 μm, whereas conventional anode tabs have a thickness of about 100 μm.

Figure 21:
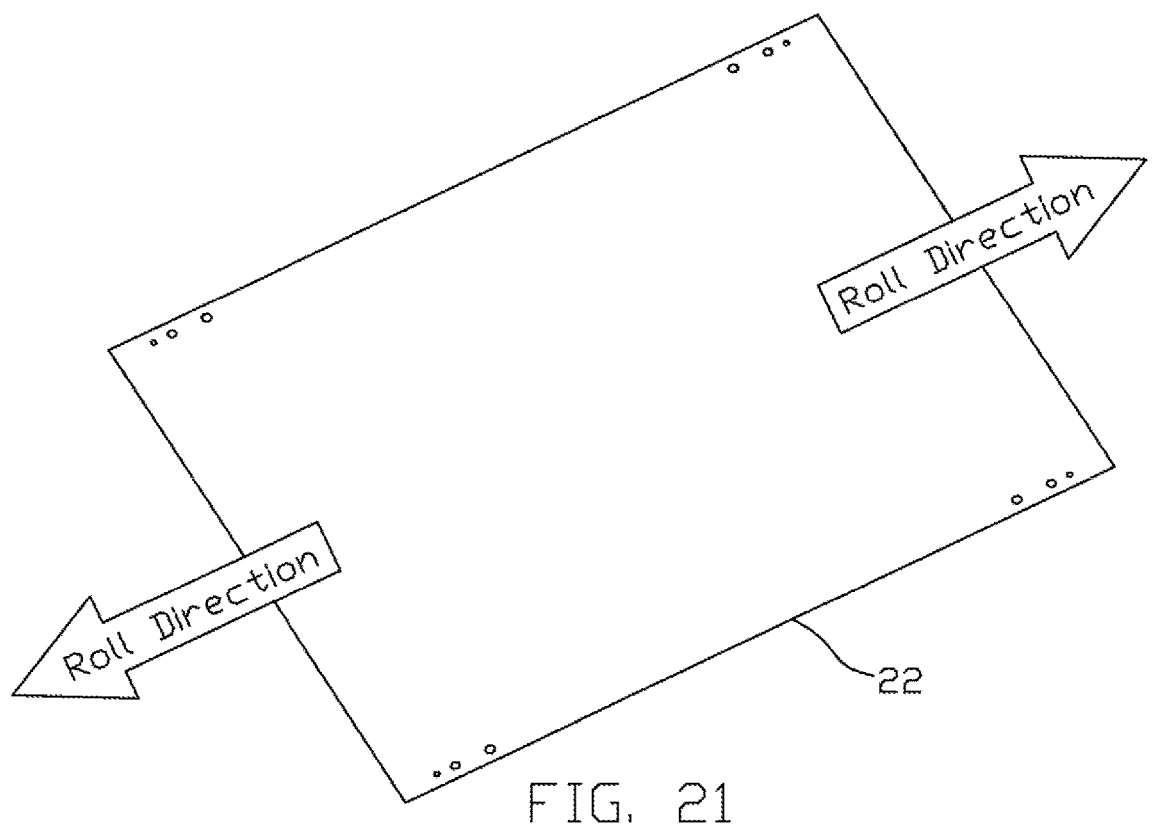
FIG. 21 illustrates a roll of base material according to some embodiments of the present disclosure.

FIGS. 21-25 describe a method of forming an array of anode tabs 21 according to some embodiments of the present disclosure. Referring to FIG. 21, a roll of base material 22 is provided. For some embodiments, the base material 22 is a material having higher conductivity than nickel. For some embodiments, the base material 22 is copper foil. For some embodiments, the copper foil is chromate treated to form a tie layer to support direct bonding of a polyimide coating. The copper foil, according to some embodiments, has a thickness from 20-50 μm. For some embodiments, the copper foil can have a thickness of 35 μm.

Figure 22:
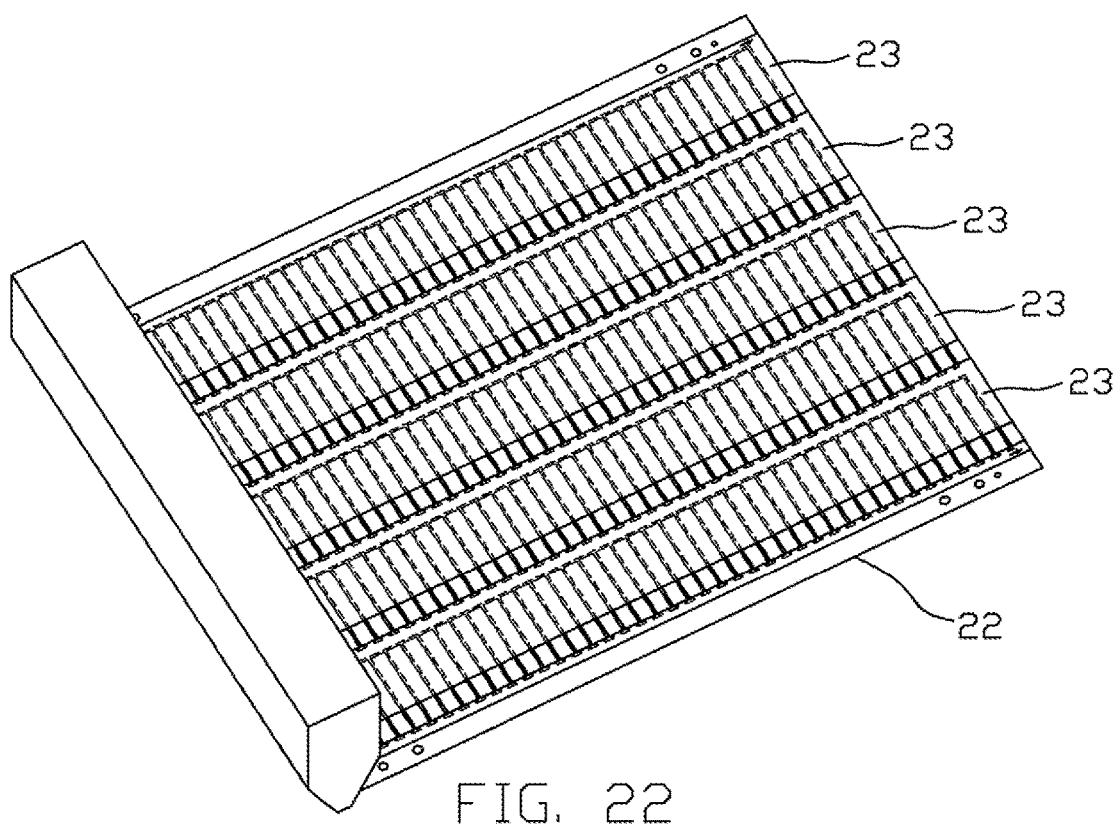
FIG. 22 illustrates a dielectric layer disposed on the base material according to some embodiments of the present disclosure.
Figure 23A:
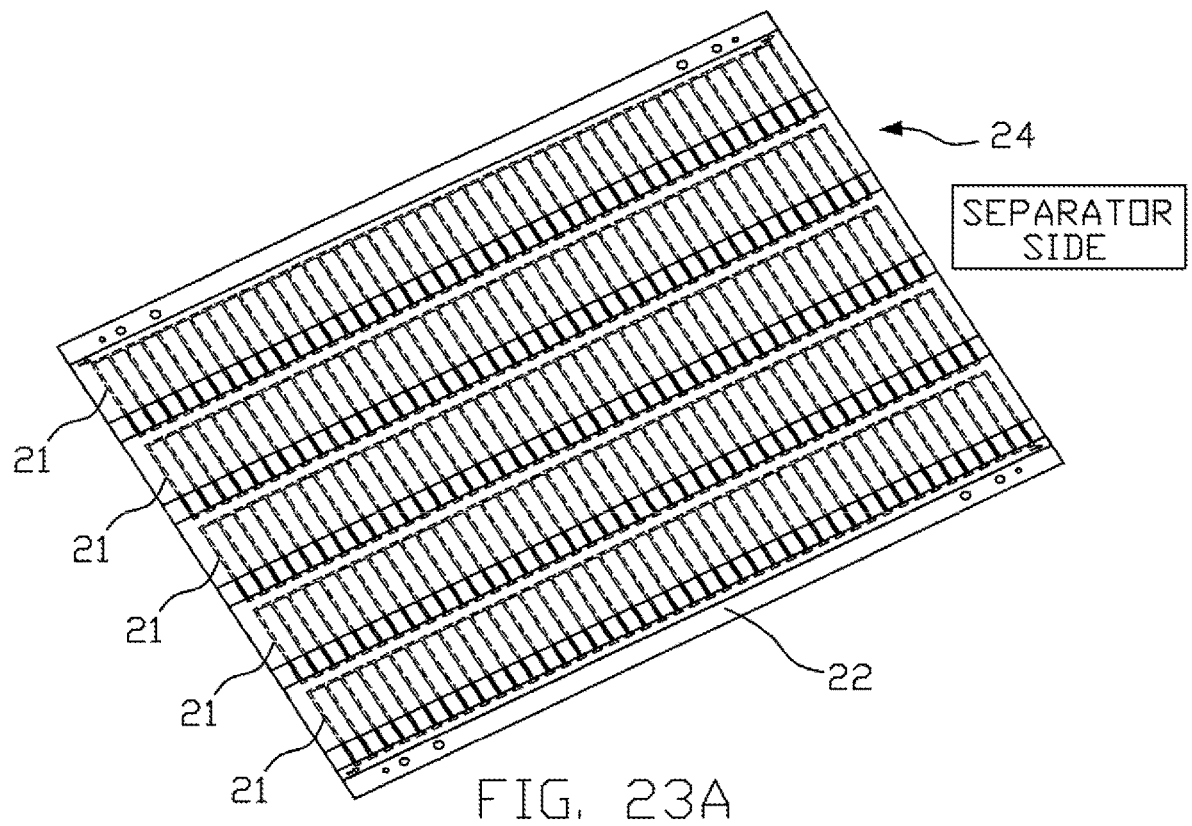
FIGS. 23A and 23B illustrate the array of anode tabs having a pattern etched thereon according to some embodiments of the present disclosure.
Figure 23B:
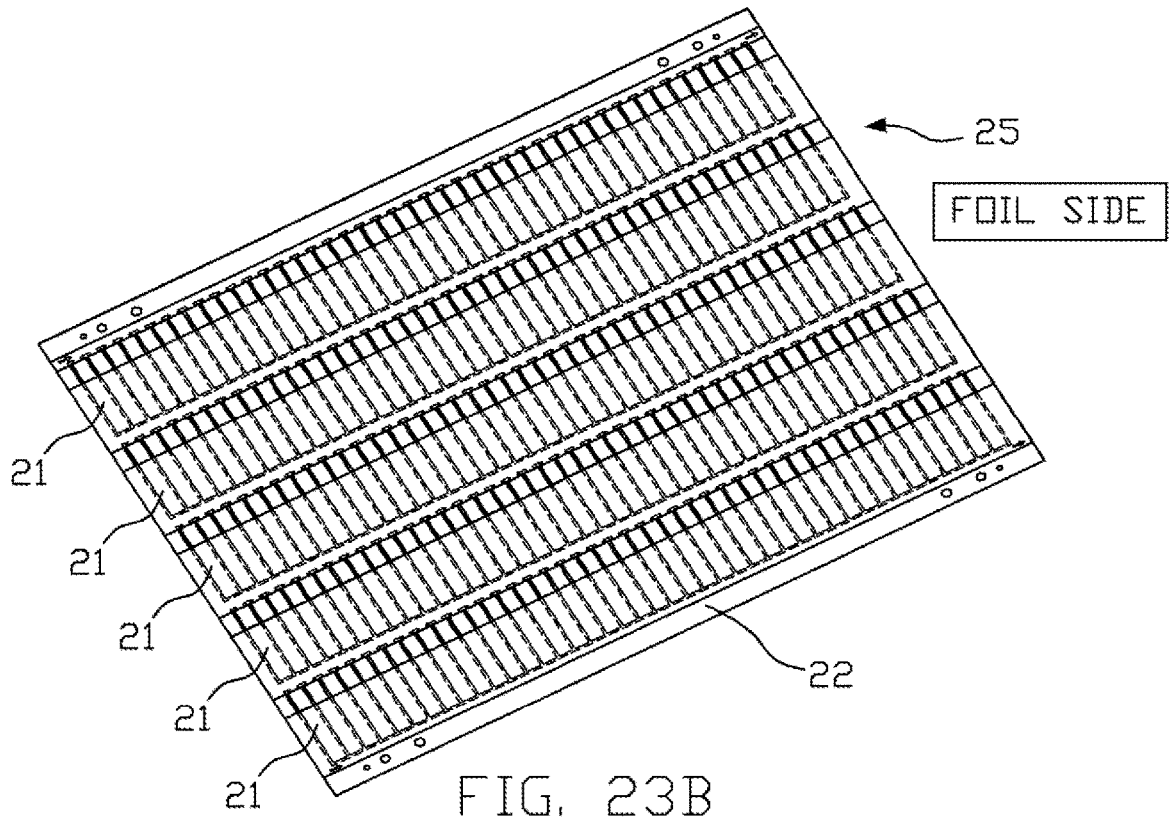

FIG. 22 illustrates a dielectric layer/insulator material, such as a polyimide coating 23, disposed on the base material 22. For some embodiments, the polyimide coating 23 is disposed only on a separator side 24, as illustrated in FIG. 23a, of the base material 22 and not on a foil side 25, as illustrated in FIG. 23b, of the base material 22. For some embodiments, the polyimide coating 23 can be applied in a thickness of 5 to 10 μm to minimize thickness of the each anode tab in the array of anode tabs 21. The polyimide coating 23 is applied using techniques including, but not limited to, liquid slot die, roller coat, spray, curtain coat, dry film lamination, and screen-printing techniques. For some embodiments, the polyimide coating 23 is applied by liquid slot die. According to some embodiments, the polyimide coating 23 is not exposed to UV light or developed.

In some embodiments, the method further includes marking and punching the base material 22, using techniques such as those described herein. Marking and punching can be performed using techniques known in the art. Marking and punching can also be performed before or after disposing the polyimide coating 23 on the base material.

FIGS. 23A and 23B illustrate the array of anode tabs 21 having a pattern etched thereon. For some embodiments, the method includes micro-etching exposed base material 22 that is not covered by the polyimide coating 23 to remove the chromate treatment. For example, micro-etching the base material 22 can occur in between lanes of the polyimide coating 23. Micro-etching can be performed using an oxidative process or by other techniques known in the art.

For some embodiments, the method further includes coating a resist layer, exposing the resist layer to UV light, developing the resist layer, etching the base material, and stripping the resist layer. A resist coating is applied on the base material 22 using techniques including, but not limited to, liquid slot die, roller coat, spray, curtain coat, dry film lamination, and screen-printing techniques. The resist coating is then exposed to UV light, developed, etched (that is, the base material 22 is etched in regions not protected by the resist pattern), and stripped using photolithography and etching techniques including those known in the art.

FIG. 24 illustrates a nickel layer 27 electroplated on the array of anode tabs 21. In some embodiments, the method includes electroplating nickel on the array of anode tabs 21. All areas of the base material having exposed copper can be electroplated with nickel. For some embodiments, the nickel layer 27 is about 1-5 μm in thickness. Preferably, the nickel layer 27 is about 2 μm in thickness. Electroplating nickel on each anode tab 11 of the array of anode tabs 21 can be performed using techniques well-known in the art.

Figure 25:
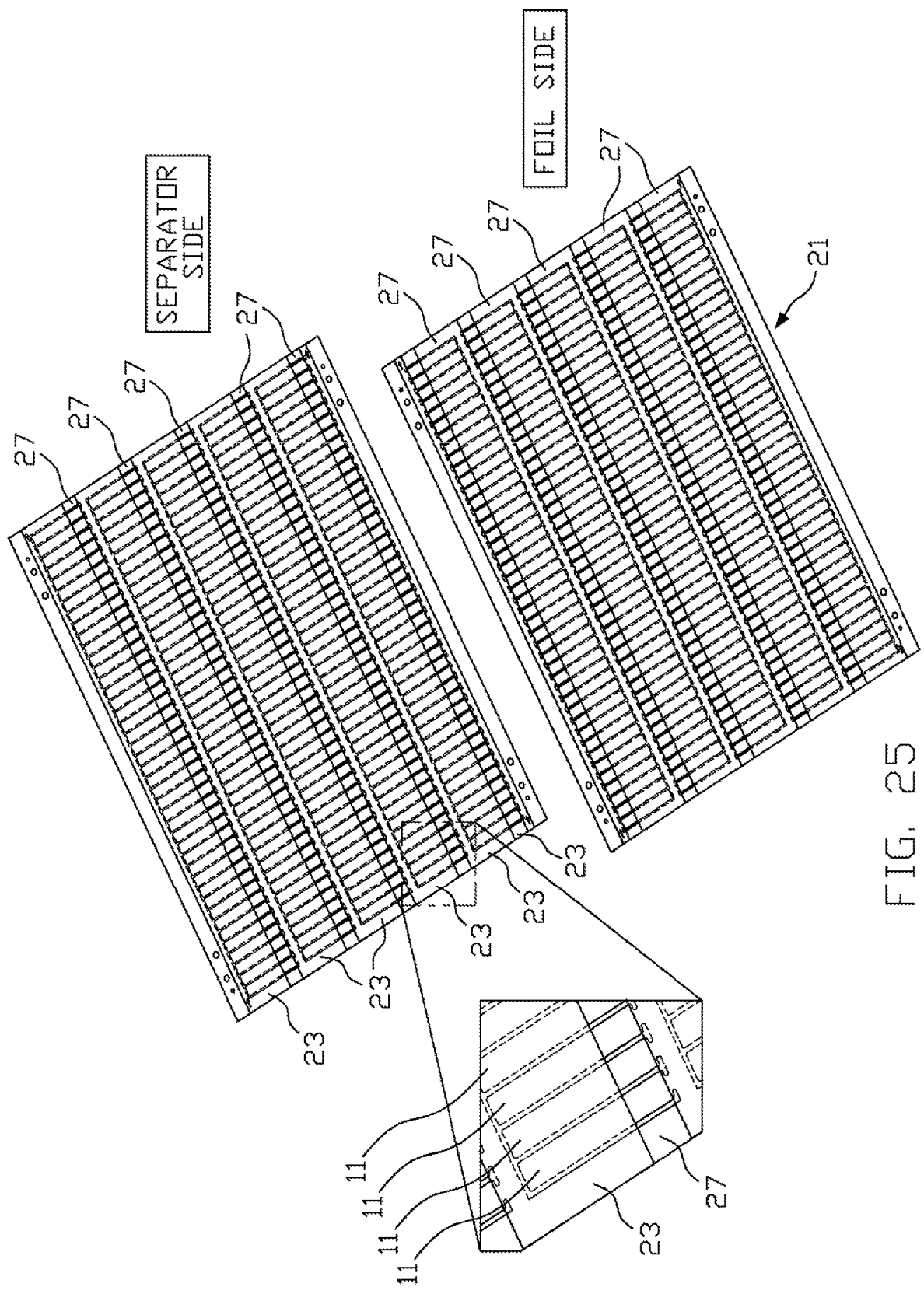
FIG. 25 illustrates an array of anode tabs that is panelized, AOI inspected, and defect-marked according to some embodiments of the present disclosure.

FIG. 25 illustrates an array of anode tabs 21 that is panelized, automated optical inspection ("AOI") inspected, and defect-marked. Such steps can be performed using techniques well-known in the art. The anode tab 11 can then be shipped in this form.

According to some embodiments, each anode tab 11 in the array of anode tabs 21 includes a dielectric layer, such as a polyimide layer 23, disposed on a single side of the anode tab constructed of nickel-plated copper. The anode tab 11 reduces the total thickness relative to the conventional anode tabs, while still maintaining the burr protection. For example, a conventional nickel/chrome tab has a thickness of about 80 μm. The conventional tab requires an additional tape having a thickness of about 10 μm for burr protection, such as one made of PET film with acrylic adhesive. Thus, the conventional anode tab has a thickness of about 90 μm. In sharp contrast, according to some embodiments of the present disclosure, the anode tab 11 can have a base material of about 35 μm and a polyimide coating of about 5-10 μm. Thus, according to some embodiments of the present disclosure, the anode tab 11 can have a thickness of about 30-45 μm, whereas conventional anode tabs have a thickness of about 90 μm.

Figure 26:
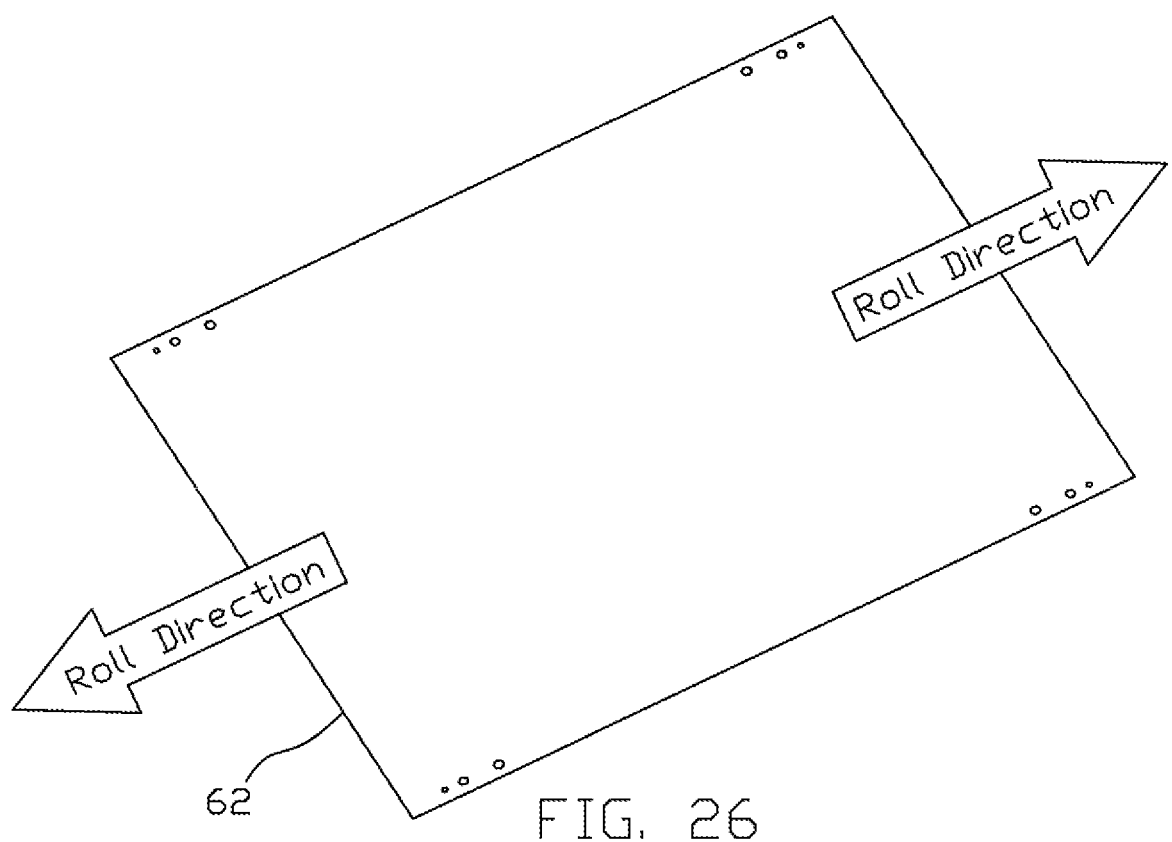
FIG. 26 illustrates a roll of base material according to some embodiments of the present disclosure.

FIGS. 26-30 describe a method of forming an array of cathode tabs 61 according to some embodiments of the present disclosure. Referring to FIG. 26, a roll of base material 62 is provided. For some embodiments, the base material 62 is aluminum foil. The aluminum foil can have a thickness from 20-50 μm according to some embodiments. For some embodiments, the aluminum foil can have a thickness of 35 μm.

Figure 27:
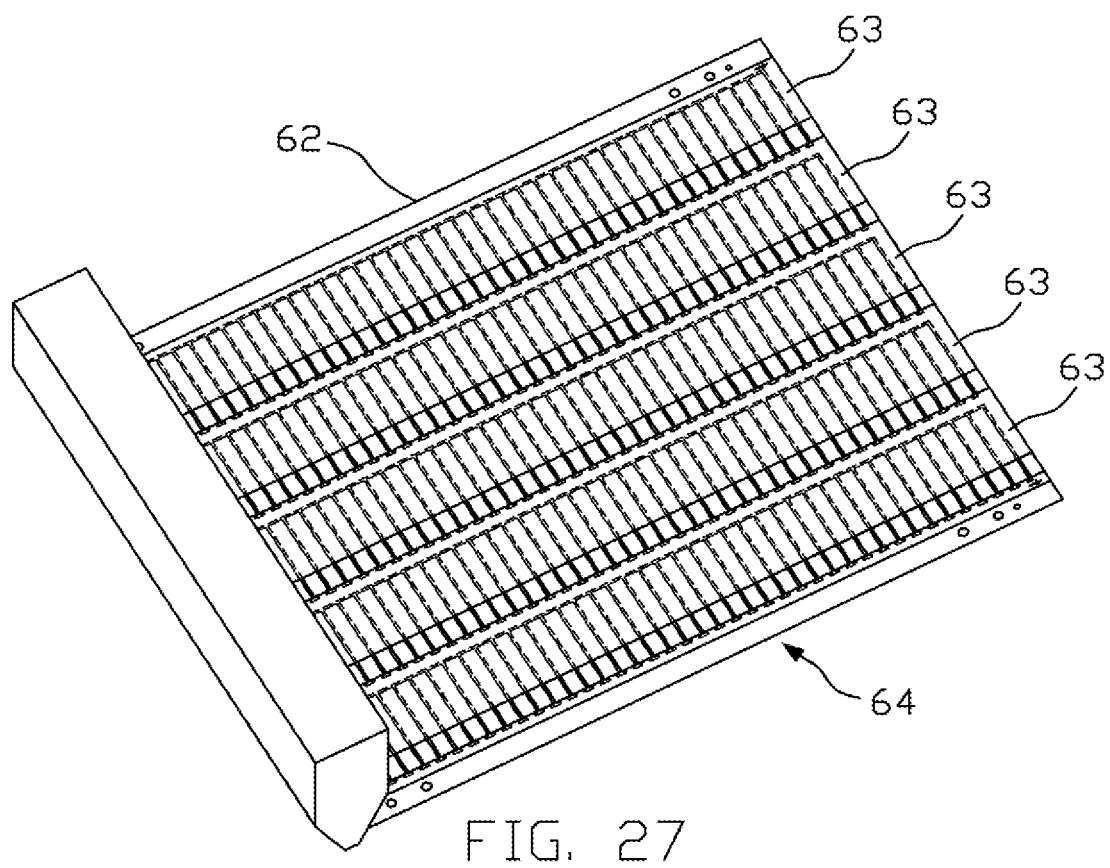
FIG. 27 illustrates a dielectric layer disposed on the base material according to some embodiments of the present disclosure.

FIG. 27 illustrates a dielectric layer, such as a polyimide coating 63, disposed on the base material 62. For some embodiments, the polyimide coating 63 is disposed only on a separator side 64 of the base material 62 and not on a foil side 65 of the base material 62. For some embodiments, the polyimide coating 63 can be applied in a thickness of 5 to 10 μm to minimize thickness of the cathode tab. The polyimide coating 63 is applied using techniques including, but not limited to, liquid slot die, roller coat, spray, curtain coat, dry film lamination, and screen-printing techniques. For some embodiments, the polyimide coating 63 is applied by liquid slot die. The polyimide coating 63 can be applied in 5 lanes as illustrated in FIG. 27. According to some embodiments, the polyimide coating 63 is not exposed to UV light or developed.

In some embodiments, the method further includes marking and punching the base material 62. Marking and punching can be performed using techniques known in the art. Marking and punching can also be performed before or after disposing the polyimide coating 63 on the base material.

Figure 28:
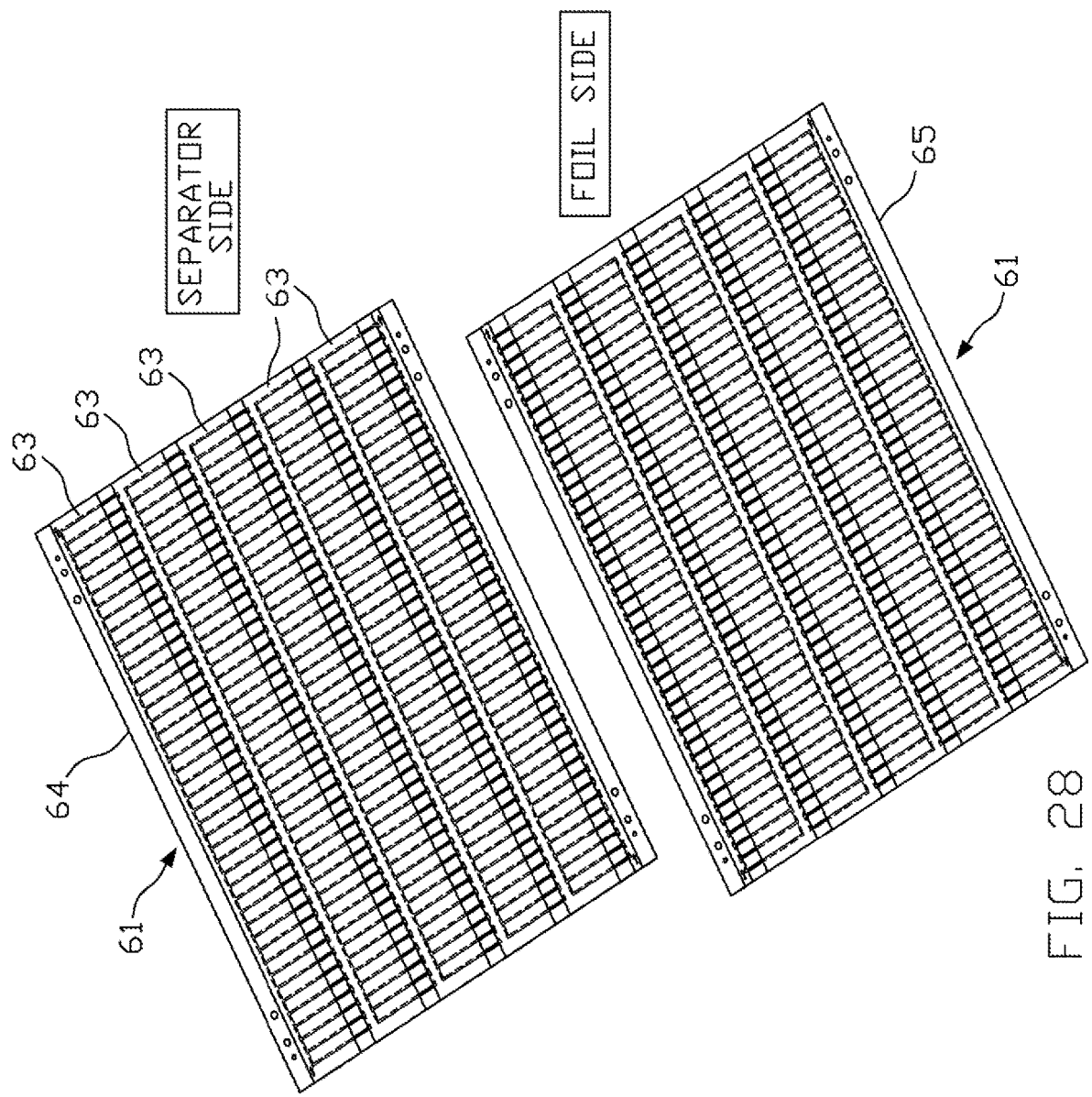
FIG. 28 illustrates an array of cathode tabs having a pattern etched thereon according to some embodiments of the present disclosure.

FIG. 28 illustrates an array of cathode tabs 61 having a pattern etched thereon. For some embodiments, the method includes coating a resist layer, exposing the resist layer to UV light, developing the resist layer, etching the base material, and stripping the resist layer. A resist coating is applied on the base material 62 using techniques including, but not limited to, liquid slot die, roller coat, spray, curtain coat, dry film lamination, and screen-printing techniques. The resist coating is then exposed to UV light, developed, etched (that is, the base material 62 is etched in regions not protected by the resist pattern), and stripped using photolithography and etching techniques including those known in the art.

Figure 29:
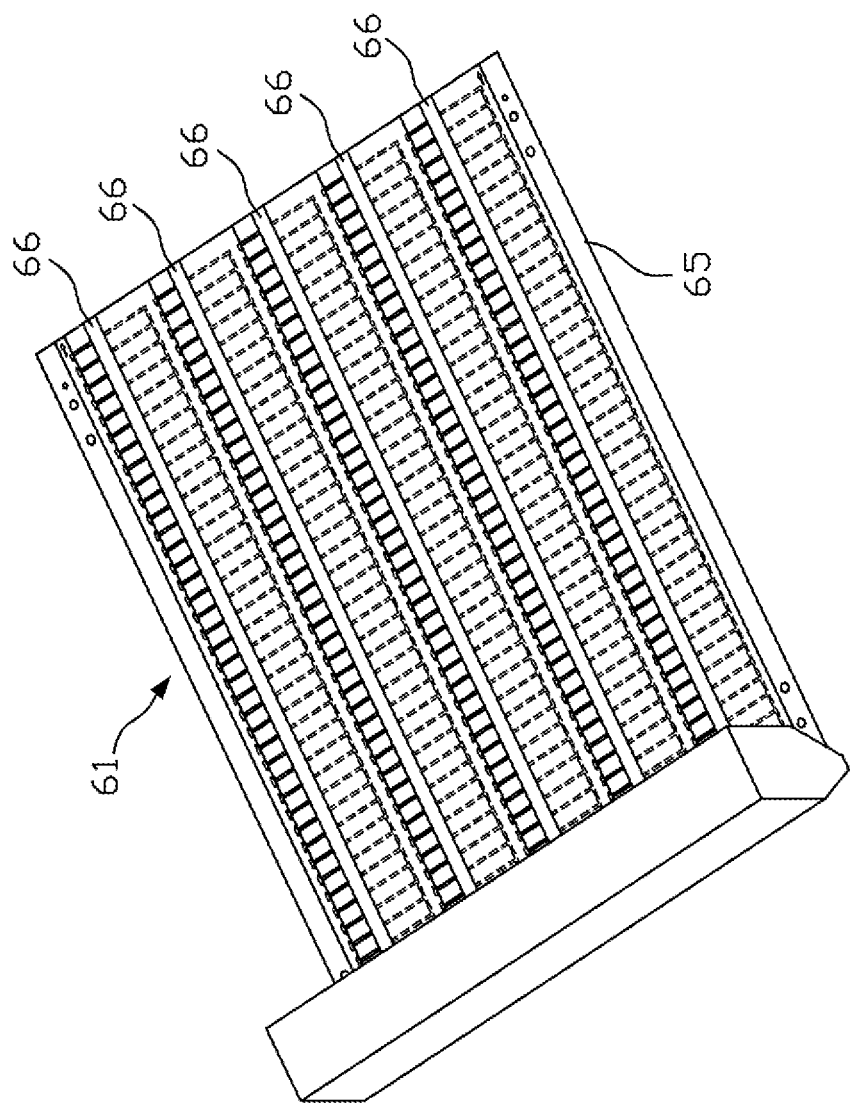
FIG. 29 illustrates an array of cathode tabs having a second dielectric layer disposed on a foil side of the base material according to some embodiments of the present disclosure.

FIG. 29 illustrates the array of cathode tabs 61 having a second dielectric layer, such as a polyimide coating 66, disposed on the foil side 65 of the base material 62. For some embodiments, the second polyimide coating 66 can be applied in a thickness of 5 to 10 μm to minimize thickness of the cathode tab. The second polyimide coating 66 is applied using techniques including, but not limited to, liquid slot die, roller coat, spray, curtain coat, dry film lamination, and screen-printing techniques. For some embodiments, the polyimide coating 66 is applied by liquid slot die. According to some embodiments, the polyimide coating 66 is not exposed to UV light or developed.

As illustrated in FIG. 29, the dielectric layer, such as polyimide coating 66, is applied in 5 narrow lanes for providing insulation to the foil side 65. For some embodiments, the narrow lanes of polyimide coating 66 are approximately 4 to 5 mm wide and cover approximately 10%-20% of the surface area coated on the separator side 64, as illustrated in FIG. 27. For some embodiments, the narrow lanes of polyimide coating 66 cover approximately 11% of the surface area coated on the separator side 64.

Figure 30:
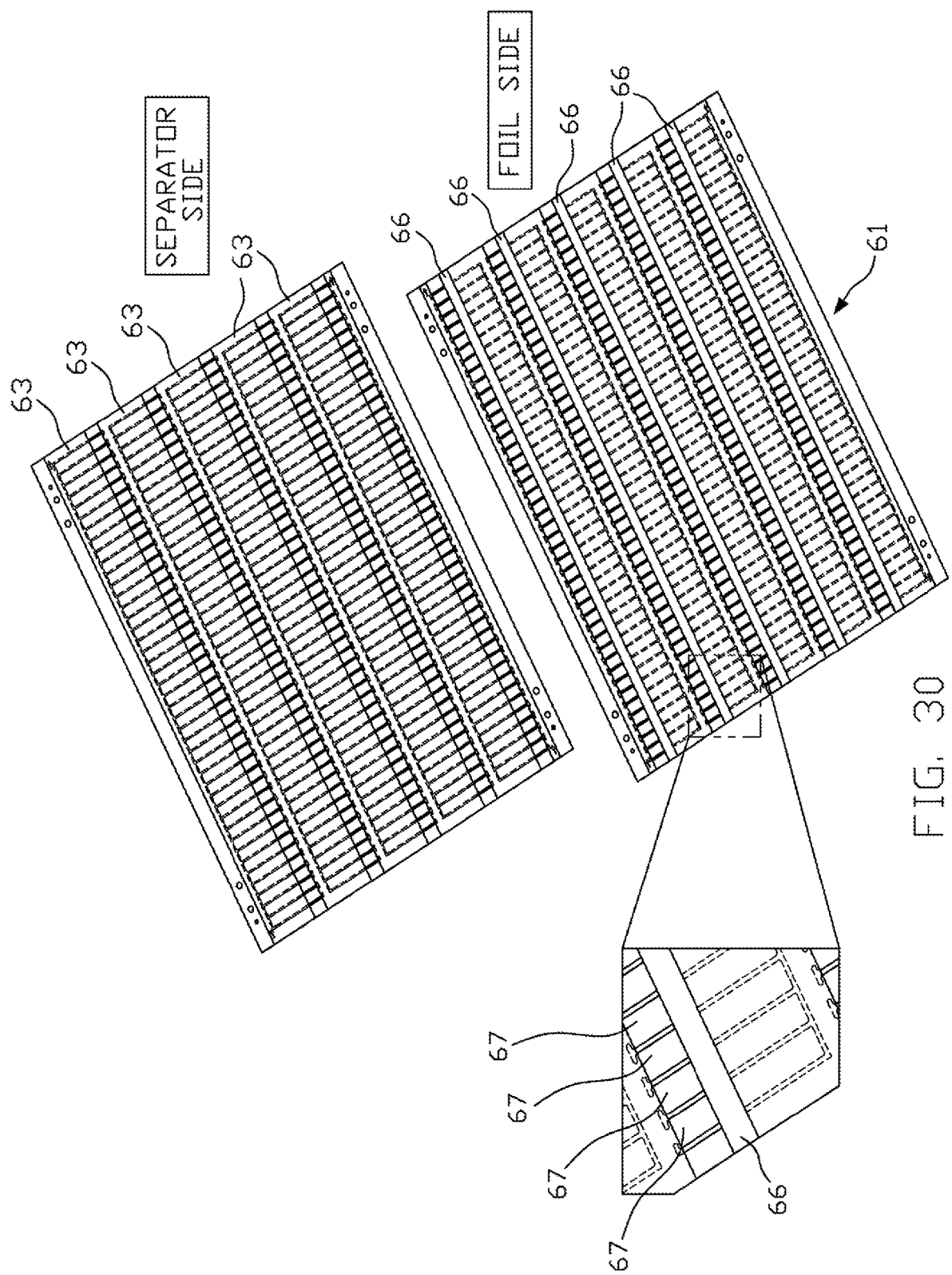
FIG. 30 illustrates an array of cathode tabs that is panelized, AOI inspected, and defect-marked according to some embodiments of the present disclosure.

FIG. 30 illustrates an array of cathode tabs 61 that is panelized, automated optical inspection (AOI) inspected, and defect-marked. Such steps can be performed using techniques well-known in the art. The array of cathode tabs 61 can then be shipped in this form.

According to some embodiments, the array of cathode tabs 61 included an dielectric layer, such as polyimide layer 63, disposed on two sides of a cathode tab 67 constructed of aluminum. The array of cathode tabs 61 reduces the total thickness relative to the conventional cathode tabs, while still maintaining the burr protection. For example, a conventional cathode tab has a thickness of about 80 µm. The conventional tab requires an additional tape having a thickness of about 10 µm for burr protection, such as one made of PET film with acrylic adhesive. Thus, the conventional cathode tab has a thickness of about 100 µm. In sharp contrast, according to some embodiments of the present disclosure, each cathode tab 67 of the array of cathode tabs 61 has a base material of about 35 µm and two polyimide coatings of about 5-10 µm each. Thus, according to some embodiments of the present disclosure, the array of cathode tabs 61 can have a thickness of about 45-55 µm, whereas conventional cathode tabs have a thickness of about 100 µm.

Figure 31:
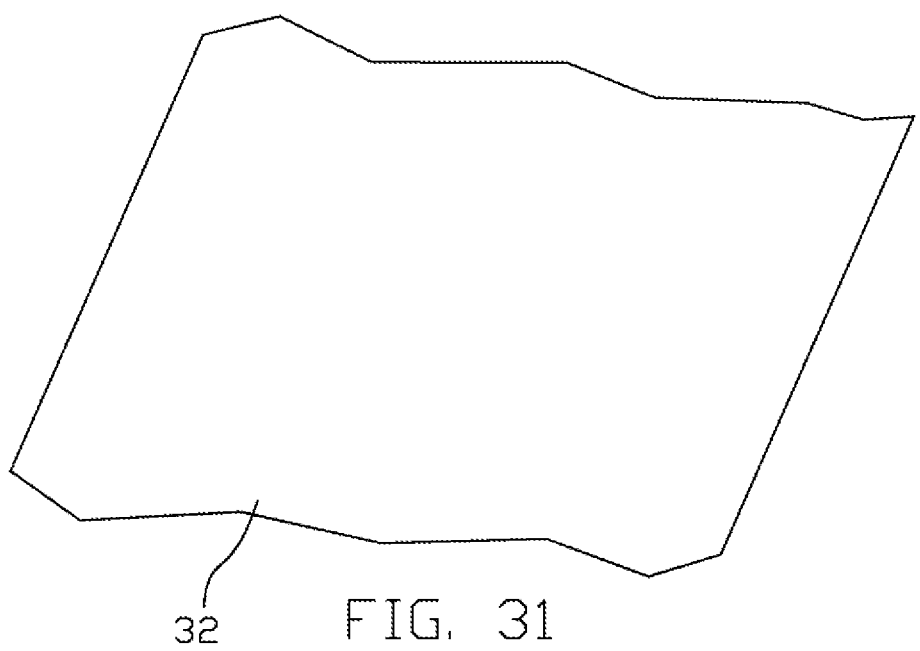
FIG. 31 illustrates a roll of base material according to some embodiments of the present disclosure.

FIGS. 31-40 describe a method of forming an array of anode tabs 31 according to some embodiments of the present disclosure. Referring to FIG. 31, a roll of base material 32 is provided. For some embodiments, the base material 32 is a material having higher conductivity than nickel. For some embodiments, the base material 32 is copper foil. For some embodiments, the copper foil has been chromate treated to support direct bonding of a polyimide coating. The copper foil can have a thickness from 20-50 µm. For some embodiments, the copper foil can have a thickness of 35 µm.

Figure 32:
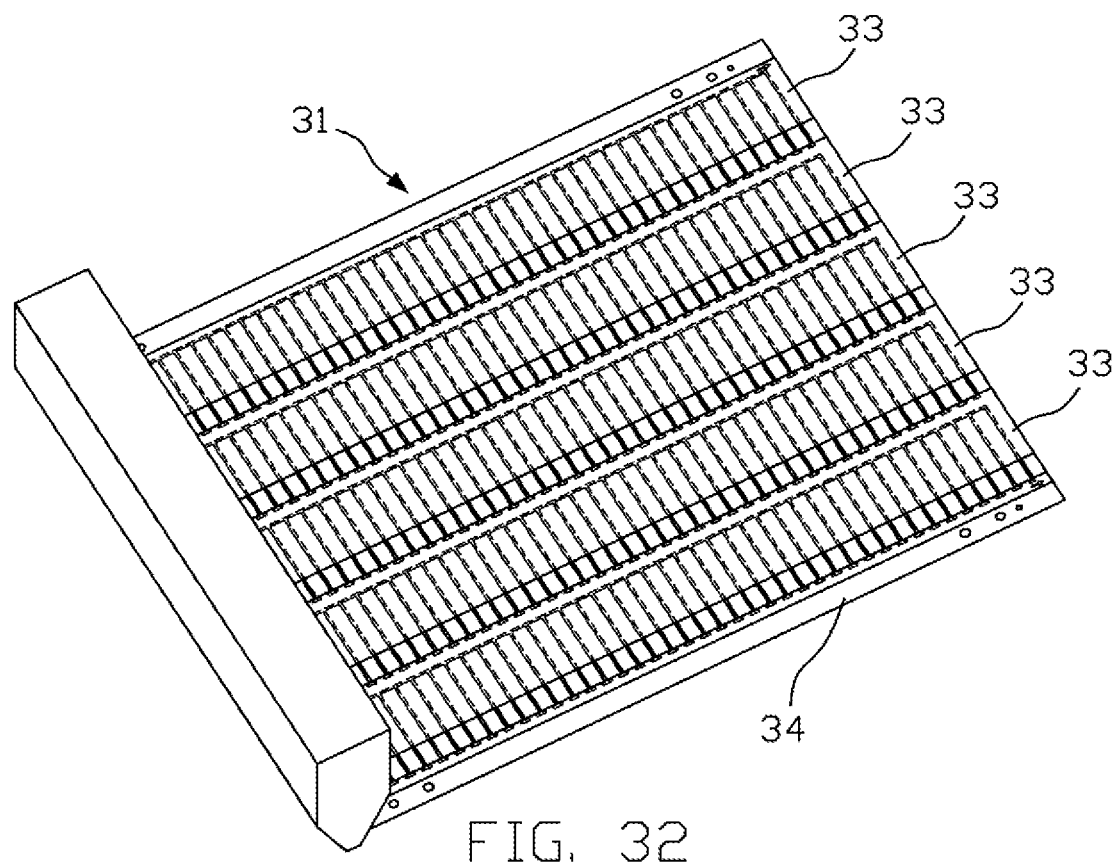
FIG. 32 illustrates a dielectric layer disposed on the base material according to some embodiments of the present disclosure.

FIG. 32 illustrates a dielectric layer, such as a polyimide coating 33, disposed on the base material 32. For some embodiments, the polyimide coating 33 is disposed only on a separator side 34 of the base material 32 and not on a foil side 35 of the base material 32. For some embodiments, the polyimide coating 33 can be applied in a thickness of 5 to 10 µm to minimize thickness of the anode tab 61. The polyimide coating 33 is applied using techniques including, but not limited to, liquid slot die, roller coat, spray, curtain coat, dry film lamination, and screen-printing techniques. For some embodiments, the polyimide coating 33 is applied by liquid slot die. According to some embodiments, the polyimide coating 33 is a photoimageable polyimide and is exposed to UV light, developed, and cured.

Figure 33:
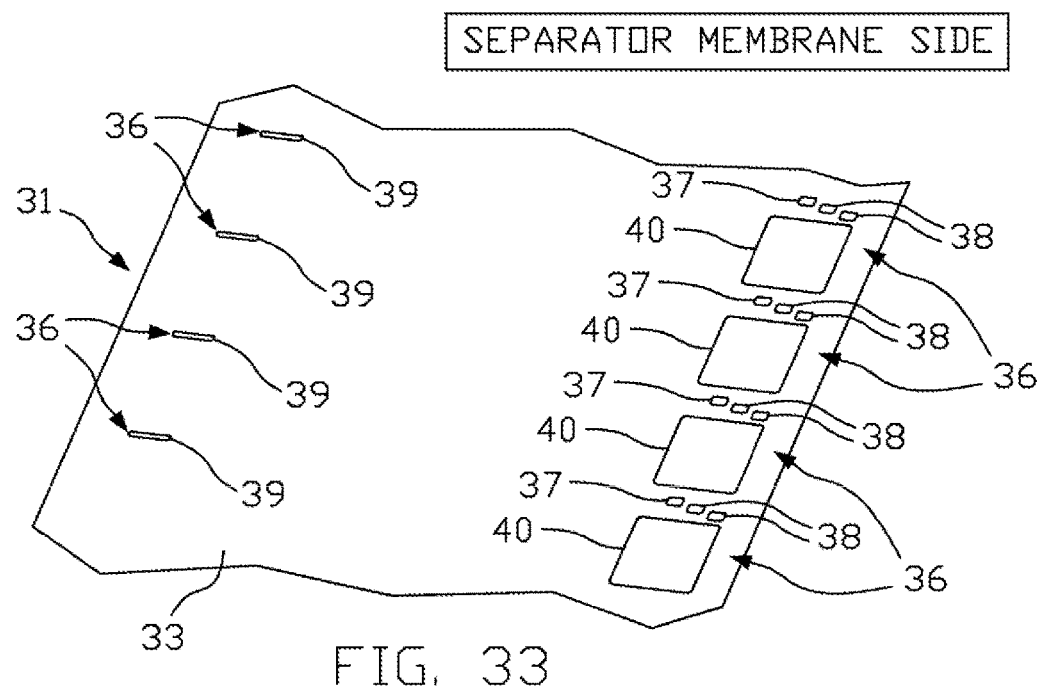
FIG. 33 illustrates a dielectric layer disposed on the separator side of the base material with a pattern etch thereon according to some embodiments of the present disclosure.

FIG. 33 illustrates the polyimide coating 33 disposed on the separator side 34 of the base material 32 with a pattern 36 etched thereon. The pattern 36 etched on the polyimide coating 33 includes access points to a reference electrode terminal 37, resistive temperature detectors ("RTD") terminals 38, a reference electrode 39, and a main anode terminal 40.

For some embodiments, to form the pattern 36 on the polyimide coating 33, a photoresist layer is formed on the polyimide coating 33. The photoresist layer, according to some embodiments, is exposed using photolithography techniques including those known in the art and developed using wet etch techniques including those known in the art. This patterned photoresist layer then provides the pattern for the polyimide coating 33 during a polyimide removal process (etching), either wet or dry techniques can be used. The photoresist layer can then be stripped by techniques known in the art. Still another patterning method is laser ablation of the unwanted dielectric.

Figure 34:
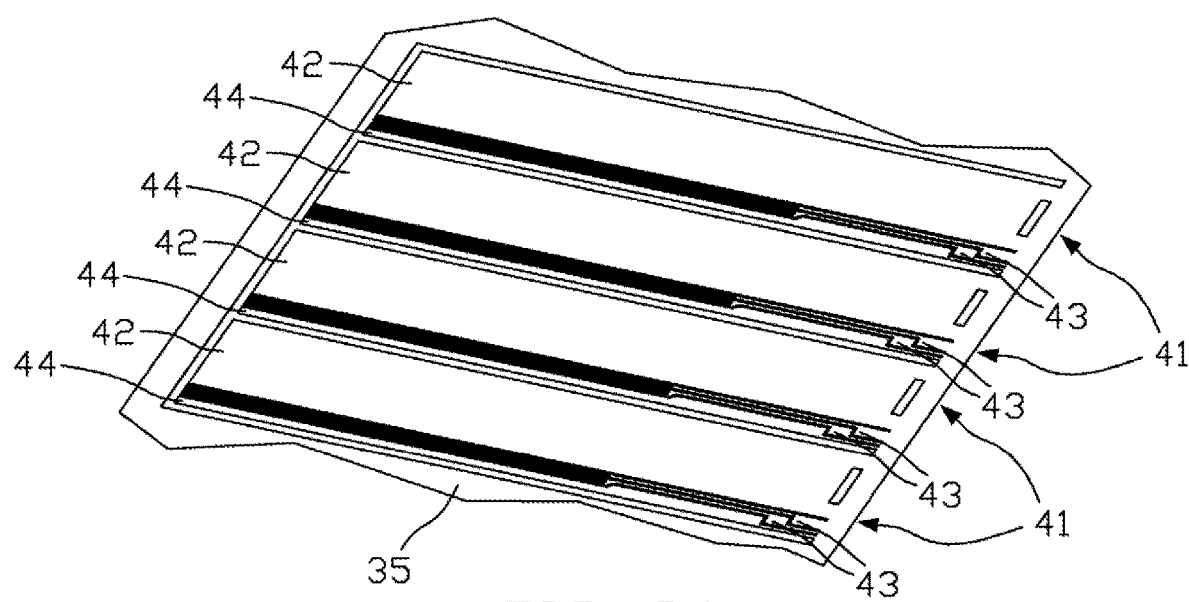
FIG. 34 illustrates a pattern etched on a foil side of the base material according to some embodiments of the present disclosure.

FIG. 34 illustrates a pattern 41 etched on the foil side 35 of the base material 32. For some embodiments, the array of anode tabs 31 after the pattern 41 is etched thereon would have a main anode 42, two RTD leads 43, and a reference electrode lead 44.

For some embodiments, to etch the pattern 41 on the foil side 35 of the base material 32, the method further includes coating a resist layer, exposing the resist layer to UV light, developing the resist layer, etching the base material, and stripping the resist layer. A resist coating is applied on the base material 32 using techniques including, but not limited to, liquid slot die, roller coat, spray, curtain coat, dry film lamination, and screen-printing techniques. The resist coating is then exposed to UV light, developed, etched (that is, the base material 32 is etched in regions not protected by the resist pattern), and stripped using photolithography and etching techniques including those known in the art.

For some embodiments, the method further includes micro-etching the array anode tabs 31 to remove the chromate treatment. Micro-etching can be performed using an oxidative process or by other techniques known in the art.

Figure 35:
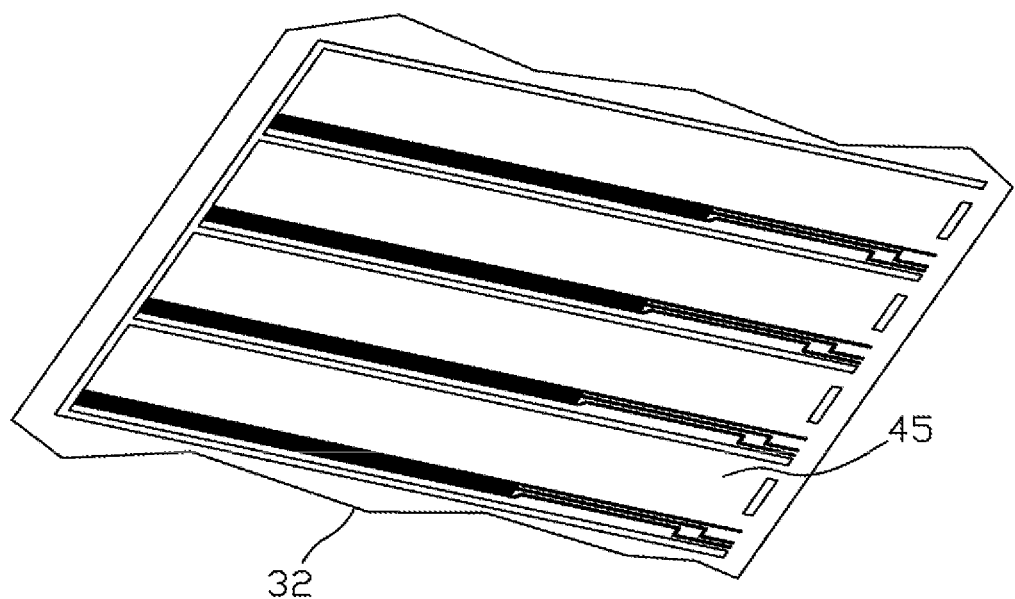
FIG. 35 illustrates a nickel layer disposed over exposed copper on the foil side of the base material according to some embodiments of the present disclosure.

FIG. 35 illustrates a nickel layer 45 disposed over the exposed copper on the foil side 35 of the base material 32. In some embodiments, the method includes sputtering nickel on the foil side 35. For some embodiments, the nickel layer 45 is about 1-5 µm in thickness. Preferably, the nickel layer 45 is about 2 µm in thickness. Sputtering nickel on the foil side 35 can be performed using techniques well-known in the art.

Figure 36:
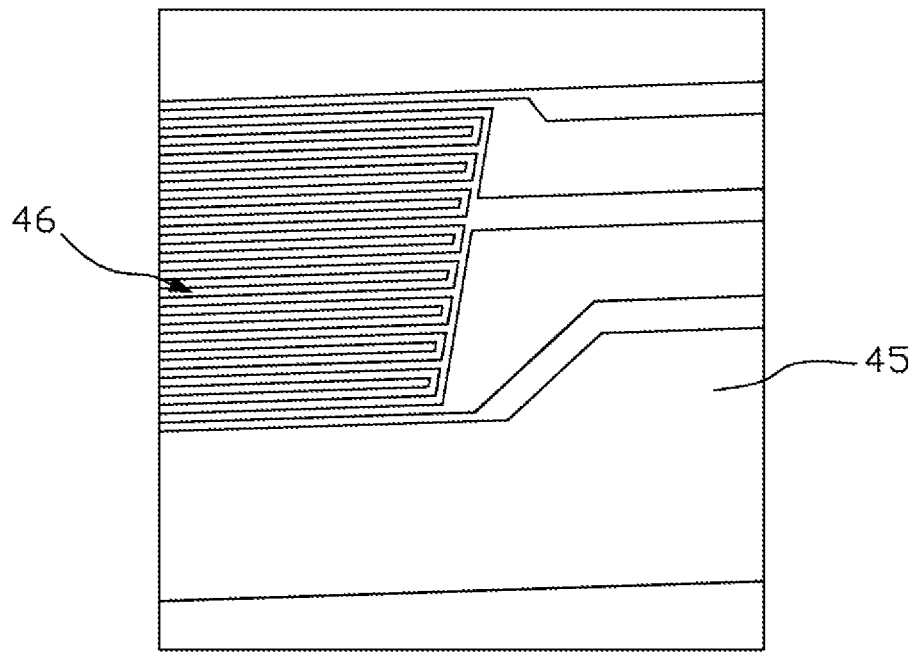
FIG. 36 illustrates a pattern etched in the nickel layer according to some embodiments of the present disclosure.

FIG. 36 illustrates a pattern 46 etched in the nickel layer 45. For some embodiments, to etch the pattern 46 on the nickel layer 45, the method further includes coating a resist layer, exposing the resist layer to UV light, developing the resist layer, etching the base material, and stripping the resist layer. A resist coating is applied on the nickel layer 45 using techniques including, but not limited to, liquid slot die, roller coat, spray, curtain coat, dry film lamination, and screen-printing techniques. The resist coating is then exposed to UV light, developed, etched (that is, the nickel layer 45 is etched in regions not protected by the resist pattern), and stripped using photolithography and etching techniques including those known in the art.

Figure 37:
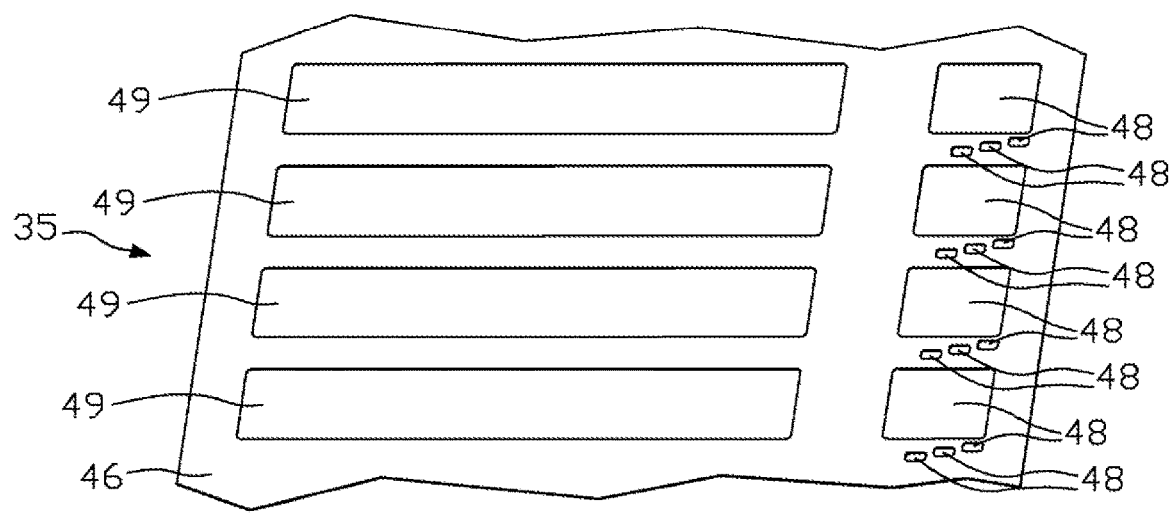
FIG. 37 illustrates a second dielectric layer disposed over the foil side with a pattern etched thereon according to some embodiments of the present disclosure.

FIG. 37 illustrates a second dielectric layer, such as a polyimide layer 46, disposed over the foil side 35 with a pattern etched thereon. For some embodiments, the polyimide coating 46 can be applied in a thickness of 5 to 10 µm to minimize thickness of the array of anode tabs 31. The second polyimide coating 46 is applied using techniques including, but not limited to, liquid slot die, roller coat, spray, curtain coat, dry film lamination, and screen-printing techniques. For some embodiments, the second polyimide coating 46 is applied by liquid slot die. According to some embodiments, the second polyimide coating 46 is a photoimageable polyimide and is exposed to UV light, developed, and cured. The pattern etched on the second polyimide coating 46 includes access points to four pin outs 48 and a main foil attach face 49. The pattern can be etched by techniques discussed in the present disclosure or other techniques known in the art.

Figure 38:
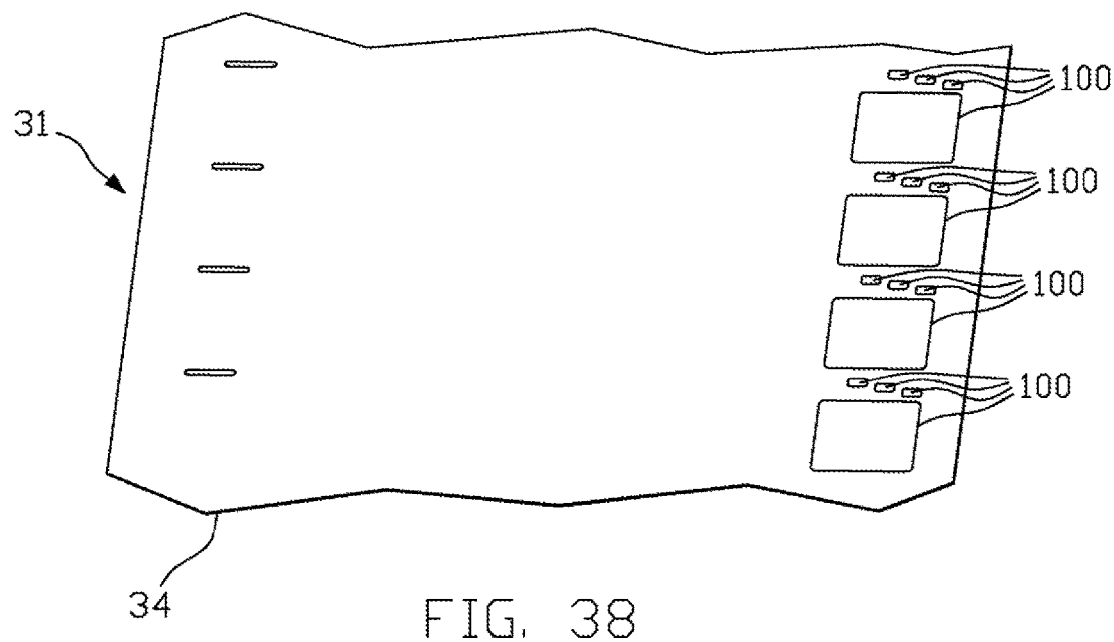
FIG. 38 illustrates an electroplated nickel layer on the array of anode tabs according to some embodiments of the present disclosure.

FIG. 38 illustrates an electroplated nickel layer 100 on the array of anode tab 31. In some embodiments, the method includes electroplating nickel on both sides (i.e., foil side and separator side) of the array of anode tabs 31. For some embodiments, the nickel layer 100 is a soft nickel and covers all the exposed nickel faces of the array of anode tabs 31. For some embodiments, the nickel layer 100 is about 1-5 µm in thickness. Preferably, the nickel layer 100 is about 2-3 µm in thickness. Electroplating nickel on the anode tape can be performed using techniques well-known in the art without a mask.

Figure 39:
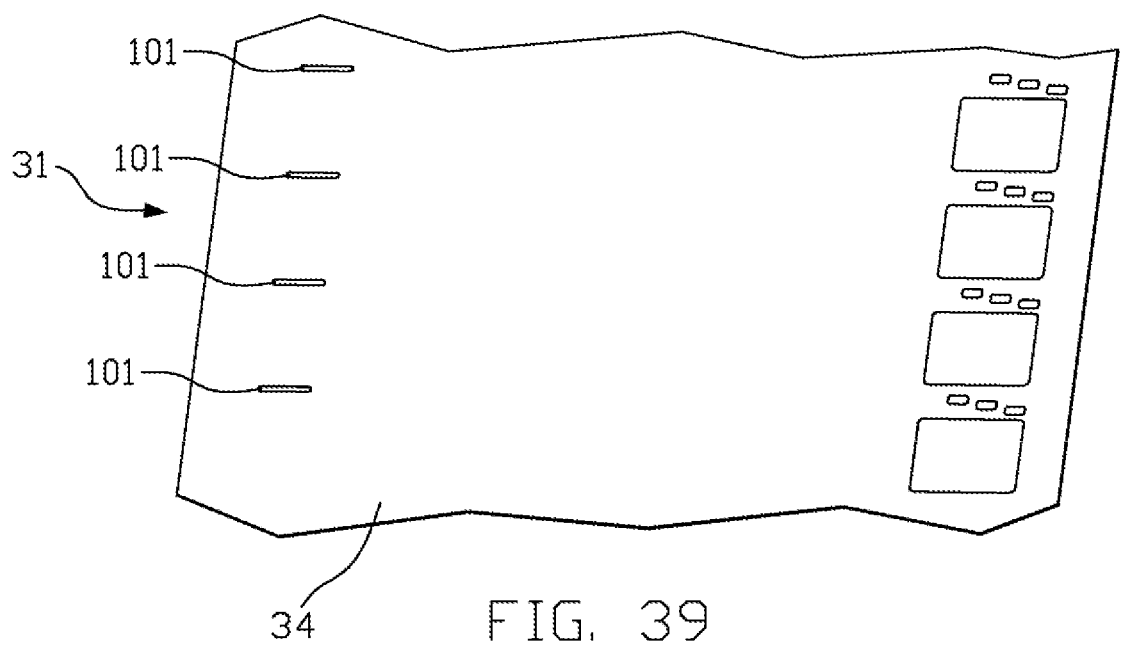
FIG. 39 illustrates an array of anode tabs that is panelized, AOI inspected, and defect-marked according to some embodiments of the present disclosure.

FIG. 39 illustrates an array of anode tab 31 that is panelized, automated optical inspection (AOI) inspected, and defect-marked. Such steps can be performed using techniques well-known in the art.

Further, the method can include selectively applying a reference electrode material 101. For some embodiments, a thin coating of graphite slurry material is selectively applied to exposed reference electrode 39 by means of inkjet, jet, syringe dispense, stencil, and other similar techniques known in the art. The method can also further include baking the anode tab 31 after selectively applying the reference electrode material 101. Baking can be performed in conditions known in the art.

Figure 40:
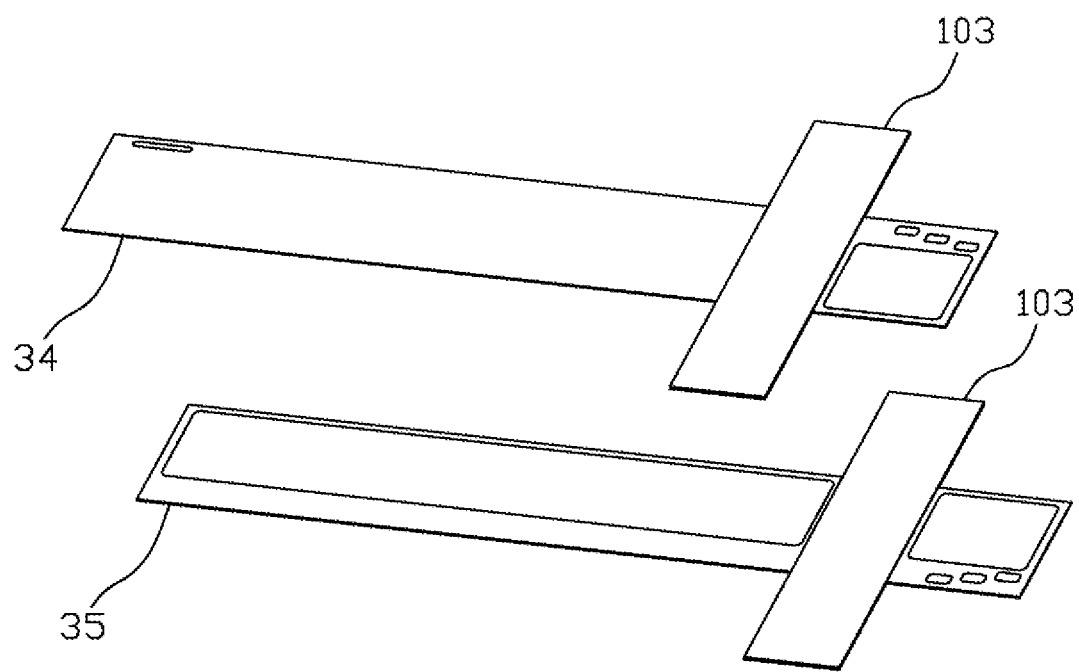
FIG. 40 illustrates an anode tab with a sealant applied thereon according to some embodiments of the present disclosure.

FIG. 40 illustrates an anode tab with a sealant 103 applied thereon on a short axis of the anode tab. For some embodiments, the method includes singulating the anode tab and applying a sealant 103 thereon. The sealant 103 can applied along a short axis of the anode tab 31 on a first side and an second side of the anode tab. For some embodiments, the sealant 103 is a heat seal tape. Other sealants known in the art can also be used.

A similar method for forming a cathode tab can be performed as the method for forming the anode tab. Those skilled in the art would readily understand the modifications to make a cathode tab based on the method for forming the anode tab. For example, the RTD would be replaced with a reference electrode and a different slurry material would be applied on the reference electrode, such as a lithium oxide material.

Although described in connection with these embodiments, those of skill in the art will recognize that changes can be made in form and detail without departing from the spirit and scope of the disclosure.

What is claimed is:

1. A method of manufacturing, comprising:
disposing a tie layer on a second side of a base material, the base material having a first side and the second side;
disposing a first dielectric layer on the tie layer on the second side of the base material;
developing the first dielectric layer on the second side of the base material according to a first pattern;
etching at least a portion of the first side of the base material to form an electrode tab;
micro-etching the tie layer after etching the first side of the base material;
electroplating nickel on the electrode tab; and
applying a second dielectric layer on at least the portion of the first side of the base material that forms the electrode tab.

2. The method according to claim 1, comprising:
rounding an edge of the base material, wherein the second dielectric layer is disposed along the rounded edge of the base material.

3. The method according to claim 1, comprising:
cutting through a polyimide coating on a perimeter of the electrode tab.

4. The method according to claim 1, comprising:
disposing a sealant on both sides of the electrode tab.

5. The method according to claim 1, wherein the electrode tab is an anode tab.

6. The method according to claim 1, wherein the electrode tab is a cathode tab.

7. The method according to claim 1 where the tie layer is an organic antioxidant.

8. The method according to claim 1 where the tie layer is a conversion coating.

9. The method according to claim 1 where the tie layer is a vapor deposited metal selected for adhesion properties.

10. The method according to claim 1 where nickel is plated via electrolytic or electroless methods.

11. A method of manufacturing, comprising:
disposing a first dielectric layer on a first side of a base material as a series of lanes disposed along the first side of the base material;
etching at least a portion of the base material according to a pattern to form an electrical tab between the series of lanes of the first dielectric layer;
rounding any edges of the etched based material;
applying a second dielectric layer on both a portion of a second side of the base material and over the rounded edges of the etched based material that forms the electrical tab; and
removing a portion of the first dielectric layer and the second dielectric layer at a perimeter of the base material to form a shape of the electrical tab.

12. The method according to claim 11, wherein the base material is a copper foil including a chromate layer.

13. The method according to claim 11, comprising:
micro-etching the base material to expose copper surface.

14. The method according to claim 11, comprising:
plating nickel on all exposed copper surfaces.

15. The method according to claim 11, wherein the base material is an aluminum foil.

16. The method according to claim 15, comprising: disposing the second dielectric layer as a series of lanes disposed along the second side of the base material and over the rounded edges of each exposed aluminum surface, the second dielectric layer comprising a polyimide.

17. The method according to claim 16, wherein the lanes of the second dielectric layer on the second side of the base material are narrower than the lanes of the first dielectric layer on the first side of the base material.

18. A method for manufacturing, comprising:
providing a base material, the base material comprising a copper foil that is chromate treated forming a chromate layer;
disposing a first photoimageable polyimide layer on a separator side of the base material;
developing the first photoimageable polyimide layer according to a first pattern;
etching a foil side of the base material according to a second pattern to form an anode tab, wherein the first photoimageable polyimide layer on the separator side of the base material patterned according to the first pattern exposes an access point to a main anode, at least two resistive temperature detector leads, and a reference electrode lead of the anode tab;
micro-etching the base material to remove the chromate layer;
disposing a nickel layer on the foil side of the base material;
etching the nickel layer to form a resistive temperature detector circuit;
disposing a second photoimageable polyimide layer on the foil side of the base material according to a third pattern to provide access points to pin outs and a main foil attach face;
developing the second photoimageable polyimide layer; and
plating nickel on the foil side and separator side of the base material.

19. The method according to claim 18, comprising:
applying a reference electrode material on the anode tab.

20. A method for manufacturing, comprising:
disposing a first photoimageable polyimide layer on a separator side of a base material, the base material is an aluminum foil;

developing the first photoimageable polyimide layer according to a first pattern;

etching at least a portion of a foil side of the base material according to a second pattern to form a cathode tab, wherein the first photoimageable polyimide layer on the separator side of the base material patterned according to the first pattern exposes an access point to a main cathode, at least two resistive temperature detector leads, and a reference electrode lead;

disposing a nickel layer on the foil side of the base material;

etching the nickel layer to form a resistive temperature detector circuit;

disposing a second photoimageable polyimide layer on the foil side of the base material; and developing the second photoimageable polyimide layer according to a third pattern such that at least the second photoimageable polyimide layer is disposed over a remaining portion of the foil side of the base material that forms the cathode tab.

21. The method according to claim 16, comprising:

applying a reference electrode material to a portion of the exposed base material on the separator side of the base material.

22. A method for manufacturing a cathode tab with integrated reference electrode, comprising:

disposing a first photoimageable polyimide layer on a separator side of the base material, the base material comprising an aluminum foil;

developing the first photoimageable polyimide layer according to a first pattern;

etching a foil side of the base material according to a second pattern to remove a portion of the foil side of the base material, wherein the first photoimageable polyimide layer on the separator side of the base material patterned according to the first pattern exposes an access point to a main cathode, at least two resistive temperature detector leads, and a reference electrode lead of the cathode tab;

disposing a second photoimageable polyimide layer on the foil side of the base material;

developing the second photoimageable polyimide layer such that the second photoimageable polyimide layer is disposed on a remaining portion of the foil side of the base material; and applying a reference electrode material to a portion of the exposed base material on the separator side of the base material.

23. A method for manufacturing a cathode tab with integrated reference electrode, comprising:

disposing a first photoimageable polyimide layer on a separator side of a base material, the base material is an aluminum foil;

developing the first photoimageable polyimide layer;

etching a foil side of the base material to remove a portion of the foil side of the base material to form the cathode tab, wherein the first photoimageable polyimide layer on the separator side of the base material exposes an access point to a main cathode, at least two resistive temperature detector leads, and a reference electrode lead of the cathode tab;

disposing a second layer comprising an insulator or dielectric layer on the foil side of the base material, the second layer comprising lanes disposed across the foil side of the base material and disposed on a remaining portion of the foil side of the base material; and applying a reference electrode material to a portion of the exposed base material on the separator side.

\* \* \* \* \*